United States Patent
Nakata et al.

(10) Patent No.: US 7,454,135 B2
(45) Date of Patent: Nov. 18, 2008

(54) CAMERA SYSTEM INCORPORATING A SEAMLESS LENS-DRIVE SWITCHING MECHANISM

(75) Inventors: Masahiro Nakata, Saitama (JP); Makoto Iikawa, Saitama (JP)

(73) Assignee: Hoya Corporation, Tokyo (JP)

( * ) Notice: Subject to any disclaimer, the term of this patent is extended or adjusted under 35 U.S.C. 154(b) by 221 days.

(21) Appl. No.: 11/280,265

(22) Filed: Nov. 17, 2005

(65) Prior Publication Data
US 2006/0104624 A1    May 18, 2006

(30) Foreign Application Priority Data
Nov. 18, 2004    (JP)    ............... 2004-335014

(51) Int. Cl.
*G03B 3/10*    (2006.01)
(52) U.S. Cl. .................... 396/133; 396/134; 396/137; 359/822; 359/823; 359/826; 74/34; 74/409; 74/440
(58) Field of Classification Search .................. 396/91, 396/137, 79, 132–134; 359/822–827; 74/34, 74/409, 440
See application file for complete search history.

(56) References Cited

U.S. PATENT DOCUMENTS

| | | | |
|---|---|---|---|
| 5,052,781 A | 10/1991 | Iizuka | |
| 5,498,944 A | 3/1996 | Nakata | |
| 5,969,889 A * | 10/1999 | Iikawa et al. | ................. 359/825 |
| 6,456,796 B1 * | 9/2002 | Tanaka et al. | ................. 396/131 |
| 7,099,576 B2 * | 8/2006 | Hamasaki et al. | ........... 396/144 |
| 7,201,262 B2 * | 4/2007 | Hamasaki et al. | ............. 192/38 |
| 7,213,693 B2 * | 5/2007 | Iikawa et al. | ................. 192/38 |
| 2002/0105731 A1 * | 8/2002 | Iikawa et al. | ................. 359/694 |
| 2005/0072646 A1 | 4/2005 | Hamasaki et al. | |
| 2005/0087416 A1 | 4/2005 | Iikawa et al. | |
| 2005/0094992 A1 | 5/2005 | Hamasaki et al. | |
| 2005/0115358 A1 | 6/2005 | Hamasaki et al. | |

FOREIGN PATENT DOCUMENTS

| | | |
|---|---|---|
| JP | 2-253214 | 10/1990 |
| JP | 2597707 | 1/1997 |

OTHER PUBLICATIONS

English language Abstract of JP 2-253214.
English language Abstract of JP 02-253210.

* cited by examiner

*Primary Examiner*—Rochelle Blackman
*Assistant Examiner*—Michael A Strieb
(74) *Attorney, Agent, or Firm*—Greenblum & Bernstein, P.L.C.

(57) ABSTRACT

A camera system incorporating a seamless lens-drive switching mechanism includes a lens drive ring, a manual operation ring, a motor, a first one-way rotational transfer mechanism preventing the manual operation ring and the lens drive ring from being connected with each other in a first neutral state, and maintains the first neutral state even if the lens drive ring is rotated by the motor; a second one-way rotational transfer mechanism which prevents the motor and the lens drive ring connecting with each other in a second neutral state, connects the motor with the lens drive ring when the motor rotates from the second neutral state, and maintains the second neutral state even if the lens drive ring is rotated by the manual operation ring; and a controller which stops and reverses the motor to bring the second one-way rotational transfer mechanism into the second neutral state.

19 Claims, 11 Drawing Sheets

CAMERA SYSTEM INCORPORATING A SEAMLESS LENS-DRIVE SWITCHING MECHANISM

BACKGROUND OF THE INVENTION

1. Field of the Invention

The present invention relates to a camera system which incorporates a seamless lens-drive switching mechanism with which lens drive mode can be switched between power lens drive mode, in which a movable lens group can be driven by motor, and manual lens drive mode, in which the same movable lens group can be driven manually.

2. Description of the Related Art

Among conventional lens barrels having either an automatically or manually adjustable focus, a lens barrel which is provided with the following elements is known in the art: a stationary ring, a movable ring which supports a focusing lens group and is arranged concentrically with the stationary ring to be movable forward and rearward in an optical axis direction, a distance adjustment ring which is arranged concentrically with the stationary ring and moves the movable ring forward and rearward in the optical axis direction by rotating about the axis of the distance adjustment ring, an AF driving force transfer mechanism which receives a driving force for rotating the distance adjustment ring from a motor installed in a camera body, and a manual focus ring (manual operation ring) which is manually rotated about the axis thereof to rotate the distance adjustment ring.

This type of lens barrel is disclosed in Japanese Unexamined Patent Publication Nos. H02-253214 and H02-253210.

However, in the lens barrel disclosed Japanese Unexamined Patent Publication No. H02-253214, the manual focus ring inevitably rotates when an auto-focusing operation is performed because a driving force of the motor is transferred to the manual focus ring when an auto-focusing operation is performed. Therefore, if the hand of the user comes in contact with the manual focus ring during the auto-focusing operation, the auto-focusing operation cannot be performed smoothly.

In the lens barrel disclosed in Japanese Unexamined Patent Publication No. H02-253210, although the manual focus ring does not rotate even if a driving force of the motor is transferred to the manual focus ring when an auto-focusing operation is performed, the manual focus ring cannot be easily rotated manually (an MF (manual focus) operation cannot be easily performed) because a predetermined load is always applied to the manual focus ring to prevent the manual focus ring from rotating easily.

SUMMARY OF THE INVENTION

The present invention provides a camera system incorporating a seamless lens-drive switching mechanism, wherein a lens drive ring for moving a movable lens group can be rotated either by a motor or manually; a rotational force of the lens drive ring is not transferred to a manual operation ring when the lens drive ring is rotated though a rotational force of the motor is transferred to the lens drive ring; wherein when the manual operation ring is manually rotated, a rotational force of the manual operation ring is transferred to the lens drive ring though a rotational force of the lens drive ring is not transferred to the motor; and the manual operation ring can be rotated smoothly.

According to an aspect of the present invention, a camera system incorporating a seamless lens-drive switching mechanism is provided, including a lens drive ring which moves a movable lens group forward and rearward in an optical axis direction by rotating about an axis of the lens drive ring; a manual operation ring which is manually rotated to rotate the lens drive ring; an electric motor for rotating the lens drive ring; a first one-way rotational transfer mechanism which prevents the manual operation ring and the lens drive ring from being connected with each other in a first neutral state, which connects the manual operation ring with the lens drive ring so that a rotation of the manual operation ring is transferred to the lens drive ring when the manual operation ring rotates in either direction from the first neutral state, and which maintains the first neutral state even if the lens drive ring is rotated by the electric motor in the first neutral state; a second one-way rotational transfer mechanism which prevents the electric motor and the lens drive ring from being connected with each other in a second neutral state, which connects the electric motor with the lens drive ring so that a rotation of the electric motor is transferred to the lens drive ring when the electric motor rotates in either direction from the second neutral state, and which maintains the second neutral state even if the lens drive ring is rotated by the manual operation ring in the second neutral state; and a controller which makes the electric motor stop rotating and subsequently makes the electric motor rotate in a reverse direction by a predetermined amount of rotation to bring the second one-way rotational transfer mechanism into the second neutral state after the electric motor rotates so as to rotate the lens drive ring. Upon the manual operation ring being manually rotated, the lens drive ring is rotated via the first one-way rotational transfer mechanism.

In an embodiment, a camera system incorporating a seamless lens-drive switching mechanism is provided, including a lens drive ring which moves a movable lens group forward and rearward in an optical axis direction by rotating about an axis of the lens drive ring; a manual operation ring which is manually rotated to rotate the lens drive ring; an electric motor for rotating the lens drive ring; a first one-way rotational transfer mechanism for transferring a rotation of the manual operation ring to the lens drive ring when the manual operation ring is manually rotated, and for preventing a rotation of the lens drive ring from being transferred to the manual operation ring when the lens drive ring is rotated by the electric motor; a second one-way rotational transfer mechanism for transferring a rotation of the electric motor to the lens drive ring when the electric motor rotates, and for preventing a rotation of the lens drive ring from being transferred to the electric motor when the lens drive ring rotates; a clutch device, incorporated in the second one-way rotational transfer mechanism, for transferring the rotation of the electric motor to the lens drive ring when the electric motor rotates in one of forward and reverse directions, and to bring the clutch into a neutral state when the electric motor subsequently rotates in the other of the forward and reverse directions by a predetermined amount of rotation; and a controller which makes the electric motor stop rotating and subsequently makes the electric motor rotate in a reverse direction by a predetermined amount of rotation to thereby disengage the electric motor and the second one-way rotational transfer mechanism from each other after the electric motor is rotated so as to rotate the lens drive ring. Upon the manual operation ring being manually rotated, the lens drive ring is rotated via the first one-way rotational transfer mechanism.

It is desirable for the lens drive ring, the manual operation ring, the first one-way rotational transfer mechanism and the second one-way rotational transfer mechanism are incorporated in a photographic lens of the camera system, wherein the electric motor and the controller are incorporated in a camera body of the camera system, and the photographic lens and the camera body include a transfer mechanism for transferring the rotation of the electric motor to the clutch device of the second one-way rotational transfer mechanism.

It is desirable for the photographic lens to include a memory in which data on the predetermined amount of rotation is stored, wherein the controller of the camera body reads out the data on the predetermined amount of rotation from the memory.

The predetermined amount of rotation can include a first predetermined amount of rotation and a second predetermined amount of rotation which are different from each other. The first predetermined amount of rotation is used in the case where the movable lens group stops moving upon abutting against a mechanical travel limit thereof while the electric motor is rotating. The second predetermined amount of rotation is used in the case where the movable lens group is made to stop moving without abutting against the mechanical travel limit.

It is desirable for the lens drive ring, the manual operation ring, the first one-way rotational transfer mechanism and the second one-way rotational transfer mechanism, the electric motor and the controller to be incorporated in a photographic lens of the camera system.

It is desirable for the lens drive ring to include a distance adjustment ring provided in a photographic lens of the camera system.

It is desirable for the movable lens group to be one of a plurality of movable lens groups of a photographic lens of the camera system other than a frontmost lens group of the plurality of movable lens groups.

It is desirable for the movable lens group to serve as a focusing lens group, the focusing lens group being moved forward and rearward in the optical axis direction by manually rotating the manual operation ring forward and reverse.

The first one-way rotational transfer mechanism can include an orthogonal surface formed on the manual operation ring to lie in a plane orthogonal to the optical axis; an annular overlapping portion formed on the manual operation ring to overlap the lens drive ring in a radial direction of the photographic lens; a torque transfer cylindrical surface formed on one of an inner peripheral surface and an outer peripheral surface of the lens drive ring to face the annular overlapping portion; at least one circumferentially-uneven-width-space forming portion formed on the annular overlapping portion to form at least one accommodation space between the annular overlapping portion and the torque transfer cylindrical surface, the accommodation space having different radial widths at different circumferential positions; a differential rotating member installed in the accommodation space, and pressed against the orthogonal surface by a biasing device, the differential rotating member revolving about an axis of the manual operation ring in a same direction as a rotational direction of the manual operation ring while revolving at a slower speed than a rotation of the manual operation ring in association with the rotation of the manual operation ring; and at least one torque transfer member installed in the accommodation space, the torque transfer member revolving about the axis of the manual operation ring in a same revolving direction as the differential rotating member when pressed by the differential rotating member. The circumferentially-uneven-width-space forming portion is shaped so that the torque transfer member, which revolves in a circumferential direction about the axis of the manual operation ring, wedges between the circumferentially-uneven-width-space forming portion and the torque transfer cylindrical surface to transfer the rotation of the manual operation ring to the lens drive ring when the manual operation ring is manually rotated.

The second one-way rotational transfer mechanism can include a rotary input shaft having an orthogonal surface lying on a plane orthogonal to an axis of the rotary input shaft; a hollow-cylindrical rotary output shaft provided around the rotary input shaft to be freely rotatable relative to the rotary input shaft about the axis thereof, the hollow-cylindrical rotary output shaft having a cylindrical inner peripheral surface; a circumferentially-uneven-width-space forming portion formed on the rotary input shaft to form an annular space including at least one accommodation space between the rotary input shaft and the cylindrical inner peripheral surface, the accommodation space having different radial widths at different circumferential positions; a differential rotating member pressed against the orthogonal surface by a biasing device, the differential rotating member revolving around the axis of the rotary input shaft in a same direction as a rotational direction of the rotary input shaft while revolving at a slower speed than a rotation of the rotary input shaft in association with the rotation of the rotary input shaft; a retainer installed in the annular space, and rotating around the axis of the rotary input shaft in a same direction as the revolving direction of the differential rotating member when pressed by the differential rotating member; and at least one torque transfer member supported by the retainer to rotate together with the retainer in the accommodation space. The circumferentially-uneven-width-space forming portion is shaped so that the torque transfer member which rotates in a circumferential direction about the axis of the rotary input shaft wedges between an outer peripheral surface of the rotary input shaft and the cylindrical inner peripheral surface of the hollow-cylindrical rotary output shaft to transfer a torque from the rotary input shaft to the hollow-cylindrical rotary output shaft when the rotary input shaft is rotated.

In an embodiment, a photographic lens is provided which is detachably attachable to a camera body, the photographic lens having a seamless lens-drive switching mechanism and including a lens drive ring which moves a movable lens group forward and rearward in an optical axis direction by rotating about an axis of the lens drive ring; a manual operation ring which is manually rotated to rotate the lens drive ring; a motor rotation transfer mechanism for rotating the lens drive ring in accordance with a rotational force transferred from the camera body when the photographic lens is detachably attached to the camera body; a first one-way rotational transfer mechanism which prevents the manual operation ring and the lens drive ring from being connected with each other in a first neutral state, which connects the manual operation ring with the lens drive ring so that a rotation of the manual operation ring is transferred to the lens drive ring when the manual operation ring rotates in either direction from the first neutral state, and which maintains the first neutral state even if the lens drive ring is rotated by the motor rotation transfer mechanism in the first neutral state; a second one-way rotational transfer mechanism which prevents the motor rotation transfer mechanism and the lens drive ring from being connected with each other in a second neutral state, which connects the motor rotation transfer mechanism with the lens drive ring so that a rotation of the motor rotation transfer mechanism is transferred to the lens drive ring when the motor rotation transfer mechanism rotates in either direction from the second neutral state, and which maintains the second neutral state even if the lens drive ring is rotated by the manual operation ring in the second neutral state; a memory which stores a value of a predetermined amount of rotation amount necessary for bringing the second one-way rotational transfer mechanism into the second neutral state when the motor rotation transfer mechanism is rotated in an opposite rotational direction upon the rotation of the motor rotation transfer mechanism is stopped after the motor rotation transfer mechanism rotates in one of forward and reverse directions so as to drive the lens drive ring; and a data output device for outputting the predetermined amount of rotation to the camera body.

In an embodiment, a camera body is provided, to which a photographic lens is detachably attachable, the camera body including a data input device for inputting data to the photographic lens when the photographic lens is detachably attached to the camera body; an electric motor; a motor rotation transfer mechanism for transferring rotation of the electric motor to the photographic lens when the photographic lens is detachably attached to the camera body; a memory which stores data of the amount of backlash of the electric motor and the motor rotation transfer mechanism when a lens rotation transfer mechanism provided in the photographic lens is driven via the electric motor and the motor rotation transfer mechanism; and a controller which inputs lens data via the data input device and drives the electric motor in accordance with the lens data. In the case where the photographic lens, which is detachably attached to the camera body, includes a lens drive ring which moves a movable lens group forward and rearward in an optical axis direction by rotating about an axis of the lens drive ring, a manual operation ring which is manually rotated to rotate the lens drive ring; the lens rotation transfer mechanism for rotating the lens drive ring in accordance with a rotational force transferred from the camera body when the photographic lens is detachably attached to the camera body, a first one-way rotational transfer mechanism which prevents the manual operation ring and the lens drive ring from being connected with each other in a first neutral state, which connects the manual operation ring with the lens drive ring so that a rotation of the manual operation ring is transferred to the lens drive ring when the manual operation ring rotates in either direction from the first neutral state, and which maintains the first neutral state even if the lens drive ring is rotated by the motor rotation transfer mechanism in the first neutral state, a second one-way rotational transfer mechanism which prevents the motor rotation transfer mechanism and the lens drive ring from being connected with each other in a second neutral state, which connects the motor rotation transfer mechanism with the lens drive ring so that a rotation of the motor rotation transfer mechanism is transferred to the lens drive ring when the motor rotation transfer mechanism rotates in either direction from the second neutral state, and which maintains the second neutral state even if the lens drive ring is rotated by the manual operation ring in the second neutral state, a lens memory which stores a value of a predetermined amount of rotation amount necessary for bringing the second one-way rotational transfer mechanism into the second neutral state when the lens rotation transfer mechanism is rotated in an opposite rotational direction upon the rotation of the lens rotation transfer mechanism being stopped after the lens rotation transfer mechanism rotates in one of forward and reverse directions so as to drive the lens drive ring, and a data output device for outputting the predetermined amount of rotation to the camera body, the controller calculates a driving amount of the electric motor necessary for bringing the second one-way rotational transfer mechanism into the second neutral state based on the backlash amount a value of a predetermined rotational amount which is input via the data input device.

Upon the electric motor being driven in one of forward and reverse directions, it is desirable for the controller to drive the electric motor in a direction opposite to that of the one of forward and reverse directions by the calculated driving amount.

In an embodiment, a photographic lens which is detachably attachable to a camera body is provided, the photographic lens having a seamless lens-drive switching mechanism and including a lens drive ring which moves a movable lens group forward and rearward in an optical axis direction by rotating about an axis of the lens drive ring; a manual operation ring which is manually rotated to rotate the lens drive ring; an electric motor for rotating the lens drive ring; a first one-way rotational transfer mechanism which prevents the manual operation ring and the lens drive ring from being connected with each other in a first neutral state, which connects the manual operation ring with the lens drive ring so that a rotation of the manual operation ring is transferred to the lens drive ring when the manual operation ring rotates in either direction from the first neutral state, and which maintains the first neutral state even if the lens drive ring is rotated by the electric motor in the first neutral state; a second one-way rotational transfer mechanism which prevents the electric motor and the lens drive ring from being connected with each other in a second neutral state, which connects the electric motor with the lens drive ring so that a rotation of the electric motor is transferred to the lens drive ring when the electric motor rotates in either direction from the second neutral state, and which maintains the second neutral state even if the lens drive ring is rotated by the manual operation ring in the second neutral state; and a controller which makes the electric motor stop rotating and subsequently makes the electric motor rotate in a reverse direction by a predetermined amount of rotation to bring the second one-way rotational transfer mechanism into the second neutral state after the electric motor rotates so as to rotate the lens drive ring. Upon the manual operation ring being manually rotated, the lens drive ring is rotated via the first one-way rotational transfer mechanism.

According to the present invention, in a lens barrel in which a lens drive ring for moving a movable lens group can be rotated by not only a driving force produced by an electric motor but also a rotation of a manual operation ring, a rotational force (torque) of the manual operation ring is securely transferred to the lens drive ring with no rotation of the lens drive ring being transferred to the electric motor by simply rotating the manual operation ring after the lens drive ring is driven by the electric motor even if the operator does not perform any special operation such as a switching operation. Consequently, the manual operation ring can be manually rotated smoothly.

The present disclosure relates to subject matter contained in Japanese Patent Application No. 2004-335014 (filed on Nov. 18, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
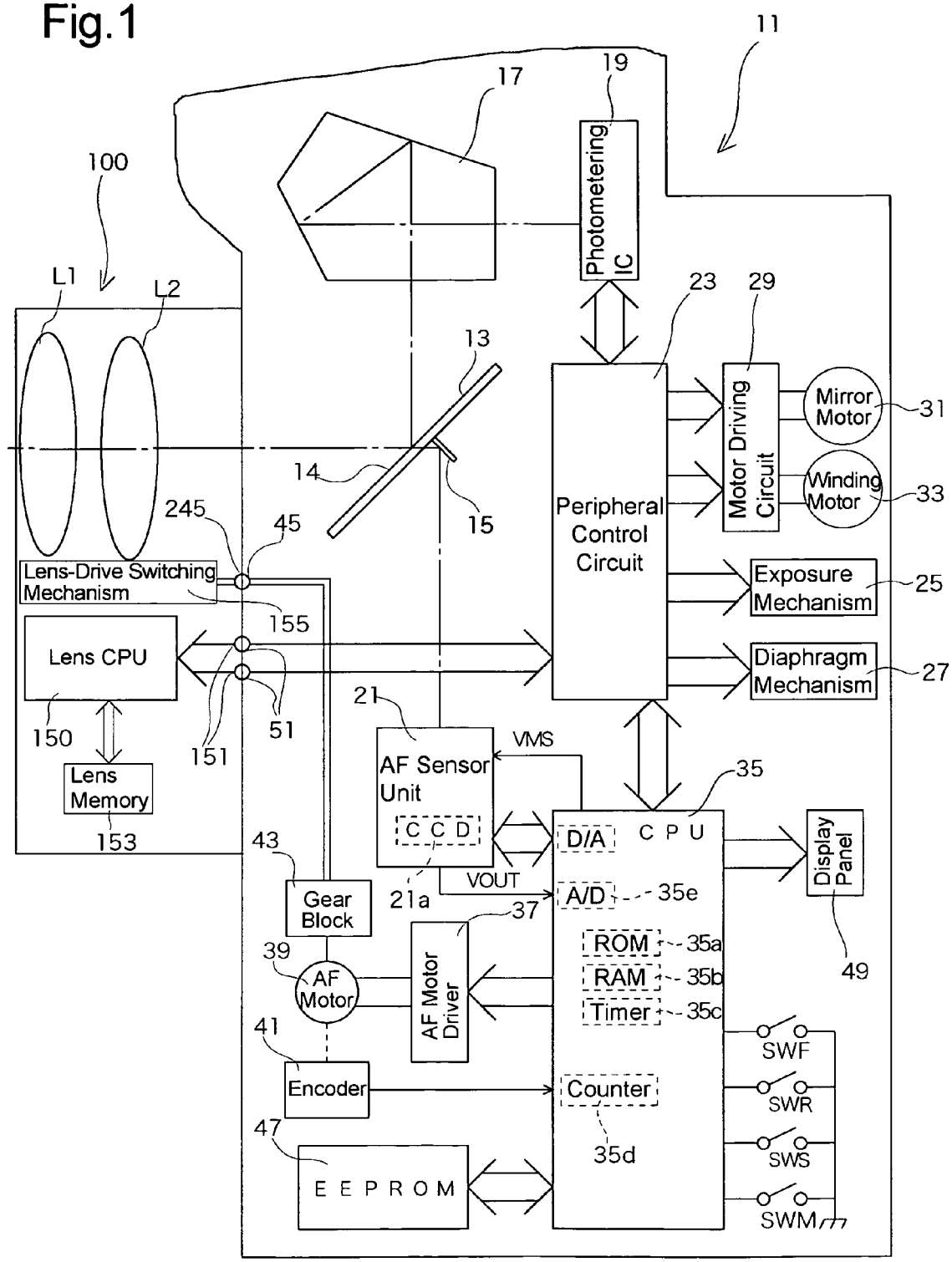
FIG. 1 is a schematic block diagram of elements of an embodiment of a single-lens reflex camera system according to the present invention that includes a camera body and a photographic lens mounted to the camera body.

FIG. 1 is a schematic block diagram showing elements of an embodiment of a single-lens reflex camera according to the present invention. The AF single-lens reflex camera is provided with a camera body 11 and an AF-capable photographic lens (lens barrel) 100 which is detachably attached to the camera body 11. The camera body 11 is provided therein with a peripheral control circuit 23 and a body CPU (controller) 35. The peripheral control circuit 23 outputs and inputs various data such as lens information and AF lens drive information to and from a lens CPU 150 incorporated in the photographic lens 100, and the body CPU 35 comprehensively controls the camera body 11 and the photographic lens 100. The lens CPU 150 controls operations of the photographic lens 100. The photographic lens 100 is provided therein with a lens memory 153 in which lens data on the photographic lens 100 is written. The photographic lens 100 sends the lens data read out from the lens memory 153 to the camera body 11.

The major portion of an object light bundle, which enters the camera body 11 through the photographic lens 100, is reflected by a main mirror 13 toward a pentagonal prism 17 serving as an element of a viewfinder optical system. The major portion of the light bundle reflected by the main mirror 13 is reflected by the pentagonal prism 17 to exit from an eyepiece (not shown). A portion of the object light bundle, which is incident on a half mirror portion 14 provided in the center of the main mirror 13, passes through the half mirror portion 14 and thereafter is reflected downward by a sub-mirror 15 provided on the rear surface of the main mirror 13 to enter an AF sensor unit 21 provided in the camera body 11.

The camera body 11 is provided therein with a photometering IC 19 which converts the light received thereby into an electrical signal in accordance with the amount of the received light to output this electrical signal to the body CPU 35 as a photometric signal via the peripheral control circuit 23. The body CPU 35 performs a predetermined exposure operation based on the photometric signal, film sensitivity information (ISO speed information), etc., to calculate an appropriate shutter speed and f-number for exposure. Thereafter, in accordance with the calculated shutter speed and the calculated f-number, the peripheral control circuit 23 drives a mirror motor 31 via a motor drive circuit 29 to lift the main mirror 13, drives a diaphragm mechanism 27 to set a diaphragm (not shown) of the photographic lens 100 to the calculated f-number, and drives an exposure mechanism (focal plane shutter) 25 to perform an exposure operation on film in accordance with the calculated shutter speed when a photographing operation is performed. After completion of the exposure operation, the peripheral control circuit 23 drives the mirror motor 31 to bring the main mirror 13 to its down position (initial position), and then drives a film winding motor 33 to advance the film by one frame.

The AF sensor unit 21 is a phase-difference detection unit using a pupil-division technique. The AF sensor unit 21 includes a pupil-division optical system (not shown) and a CCD line sensor 21a. The pupil-division optical system performs pupil-division on an object light bundle incident thereon, which forms an object image within a focus detection area in a photographing area (not shown), to divide the object light bundle into two light bundles on a focus detection plane which is provided at an optically equivalent position to that of an image pickup plane, while the CCD line sensor 21a receives each of the two light bundles and integrates (accumulates) the two light bundles as electrical charges (electrical signal). The electrical charges accumulated by the CCD line sensor 21a are successively converted into voltages which are output to the body CPU 35 as a video signal in pixel units.

The body CPU 35 converts a video signal VOUT input from the AF sensor unit 21 into a digital signal via an A/D converter 35e incorporated in the body CPU 35, and calculates the amount of defocus by performing a predetermined calculation (defocus-prediction calculation) based on a digital signal which corresponds to the focus detection area. Subsequently, based on the calculated amount of defocus, the body CPU 35 determines the direction of rotation of an AF motor 39 for driving a focusing lens group L2 of the photographic lens 100, calculates the number of revolutions of the AF motor 39 as the number of pulses output from an encoder 41 for detecting the number of revolutions of the AF motor 39, and sets a built-in counter 35d to this calculated number of revolutions. Accordingly, based on the direction of rotation and the number of pulses determined by the body CPU 35, the body CPU 35 drives the AF motor 39 via an AF motor driver 37. Upon driving the AF motor 39, the body CPU 35 operates simultaneously with the rotation of the AF motor 39 to count pulses output from the encoder 41 by the built-in counter 35d. The body CPU 35 reduces the rotation speed of the AF motor 39 by PWM control upon the counter value of the built-in counter 35d reaching a PWM control commencement pulse, and stops the operation of the AF motor 39 upon the counter value of the built-in counter 35d reaching zero. The PWM control commencement pulse represents the pulse number at which a speed reduction control for reducing the rotation speed of the AF motor 39, which is driven by a direct current, commences to stop the operation of the AF motor 39 at an in-focus position when there are only a small number of pulses remaining for driving the AF motor 39.

Rotation of the AF motor 39 is transferred to the photographic lens 100 (the focusing lens group L2) via a gear unit 43, a body joint 45, a lens joint 245 and a lens-drive switching mechanism 155 which constitute a motor rotation transfer mechanism. The lens joint 245 is provided on a mount portion of the photographic lens 100 and the body joint 45 is provided on a mount portion of the camera body 11. The gear unit 43 is provided in the camera body 11 between the AF motor 39 and the body joint 45. The lens-drive switching mechanism 155 is provided in the photographic lens 100 between the lens joint 245 and the focusing lens group L2.

As shown in FIG. 1, the body CPU 35 includes a ROM 35a in which control programs and other programs are written, a RAM 35b in which predetermined data for calculation and control are temporarily stored, a timer 35c for time measurement, the built-in counter 35d, and an A/D converter 35e for performing A/D conversion on a video signal input from the AF sensor unit 21. An EEPROM 47 is connected to the body CPU 35 as an external memory. The EEPROM 47 stores various constants specifically for use for components provided in the camera body 11.

Furthermore, a focus switch SWF, a photometering switch SWS, a release switch SWR and a main switch SWM are also connected to the body CPU 35. The focus switch SWF is for switching focus mode between manual focus (MF) mode and auto-focus (AF) mode (single-frame/consecutive photographing AF mode). The photometering switch SWS is turned ON while a release button (not shown) is pressed halfway down or completely down. The release switch SWR is turned ON upon the release button being fully depressed. The main switch SWM is for turning ON and OFF a power source to the peripheral control circuit 23 and others.

The body CPU 35 displays set modes such as AF mode, exposure mode and photographing mode, and also a selected shutter speed and a selected f-number, on a display device 49 of the camera body 11. The display device 49 generally includes display panels provided at two positions, i.e., on an outer surface of the camera body 11 and within a field of view of a view finder of the camera body 11.

The photographic lens 100 is provided therein with a fixed lens group L1 and the focusing lens group L2 positioned behind the fixed lens group L1, and is further provided with the lens-drive switching mechanism 155 with which lens drive mode can be switched between an auto lens drive mode, in which the focusing lens group L2 can be driven automatically in the optical axis direction, and a manual lens drive mode, in which the focusing lens group L can be driven manually. The lens CPU 150 is connected to the peripheral control circuit 23 of the camera body 11 via a plurality of electrical contacts (data input/output device) 51 and a corresponding plurality of electrical contacts 151 which are provided on the mount portion of the photographic lens 100 and the mount portion of the camera body 11, respectively. The lens CPU 150 performs predetermined data communication with the body CPU 35 via the peripheral control circuit 23 for data such as distance information (information on the lens position of the focusing lens group L2), focal distance information, f-number information, and information on reverse direction feed.

FIGS. 2 through 6 show the photographic lens 100 that incorporates a seamless AF/MF switching mechanism (seamless lens-drive switching mechanism) with which lens drive mode can be switched between the auto-focus mode (AF mode), in which the focusing lens group L1 is driven by motor, and the manual focus mode (MF mode), in which the focusing lens group L2 is manually driven. Details of the seamless AF/MF switching mechanism disclosed in FIGS. 1 through 9 which is applied to the present invention is disclosed in U.S. Pat. No. 10/958,219. Firstly, the overall structure of the photographic lens 100 will be discussed hereinafter.

Figure 2:
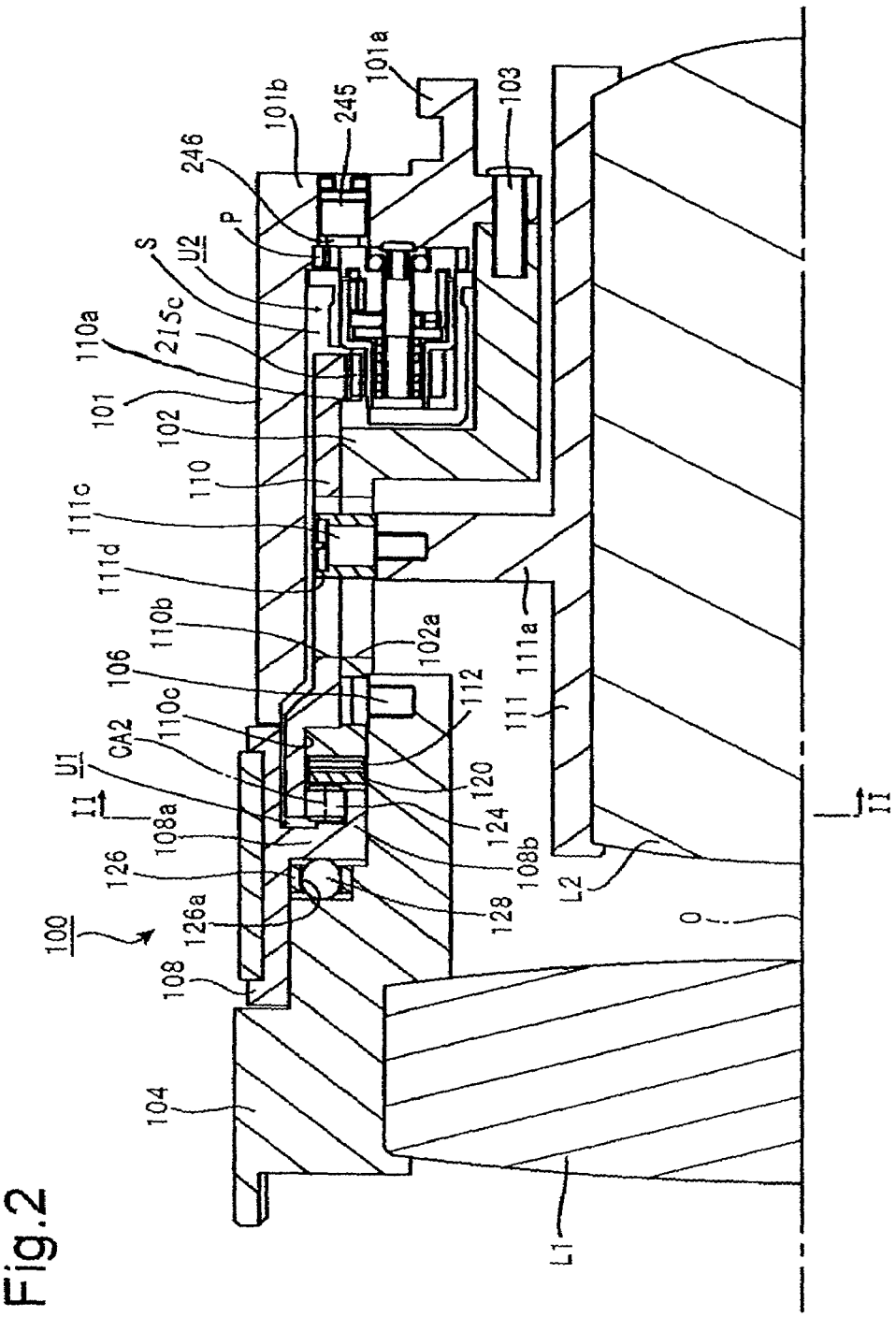
FIG. 2 is a longitudinal cross sectional view of an upper half of the photographic lens from the optical axis thereof.

In the following descriptions, the front and rear of the photographic lens 100 correspond to the left and right sides of the photographic lens 100 as viewed in FIG. 2, respectively. The photographic lens 100 is provided with a first stationary ring 101 having a mount portion (bayonet mount portion) 101a at a rear end of the first stationary ring 101. The mount portion 101a is mounted to a body mount provided on the camera body 11 via a bayonet engagement when the photographic lens 100 is attached to the camera body 11. The photographic lens 100 is provided inside the first stationary ring 101 with a second stationary ring 102, the rear end of which is fixed to the rear end of the first stationary ring 101 by set screws 103 (only one of them is shown in FIG. 2) in a manner to form an installation space S having an annular shape as viewed from the front thereof between the first stationary ring 101 and the second stationary ring 102. The second stationary ring 102 is provided, at equi-angular intervals in a circumferential direction of the second stationary ring 102, with a set of three linear guide slots 102a extending a forward/rearward direction of the photographic lens 100.

The photographic lens 100 is provided in a rear wall 101b of the first stationary ring 101 with the lens joint 245 that can be freely engaged with and disengaged from the body joint 45 of the camera body 11. The rear end (engaging end) of the lens joint 245 is exposed to the outside of the photographing lens 100 from the rear wall 101b. A rotary shaft 246 which is integral with the lens joint 245 projects forward (leftward as viewed in FIG. 2) from the front end of the lens joint 245, and a pinion (output gear) P is firmly fitted on the rotary shaft 246 so as to jut into the installation space S.

A lens holder ring 104 which holds the stationary lens group L1 is fixed at its rear end to an inner peripheral surface of the second stationary ring 102 at a front end thereof by set screws (only one of them is shown in FIG. 2) 106.

The photographic lens 100 is provided, in an annular space formed between a front end portion of the first stationary ring 101 and the lens holder ring 104, with a manual focus ring (manual operation ring) 108 which is concentrically provided with the first stationary ring 101 to be freely rotatable about the optical axis O and to be immovable in the optical axis direction.

The photographic lens 100 is provided in an annular space between the first stationary ring 101 and the second stationary ring 102 with a distance adjustment ring (lens drive ring) 110 which is positioned to be freely rotatable about the optical axis O and to be immovable in the optical axis direction. The distance adjustment ring 110 is provided, circumferentially around the entire inner peripheral surface of a rear end of the distance adjustment ring 110, with an input gear 110a. The distance adjustment ring 110 is provided at equi-angular intervals in a circumferential direction thereof with a set of three cam grooves 110b which are inclined with respect to the set of three linear guide slots 102a. An inner peripheral surface (torque transfer cylindrical surface) 110c of the distance adjustment ring 110 in the vicinity of the front end thereof is formed in a circular shape as viewed from front of the distance adjustment ring 110.

The photographic lens 100 is provided radially inside the second stationary ring 102 with a movable ring 111 for holding the focusing lens group (movable lens group) L2. The movable ring 111 is provided, on an outer peripheral surface thereof at equi-angular intervals in a circumferential direction, with a set of three radial projections 111a. A roller 111d is fixed to an end surface of each radial projection 111a by an associated set screw 111c. Each roller 111d passes through the associated linear guide slot 102a to be engaged with the associated cam groove 110b.

The manual focus ring 108 is provided on an inner peripheral surface thereof with an annular wall 108a which projects radially inwards from the inner peripheral surface of the manual focus ring 108. The manual focus ring 108 is further provided at the inner edge of the annular wall 108a with an annular projection (annular overlapping portion) 108b which projects rearward from the inner edge of the annular wall 108a.

Figure 3:
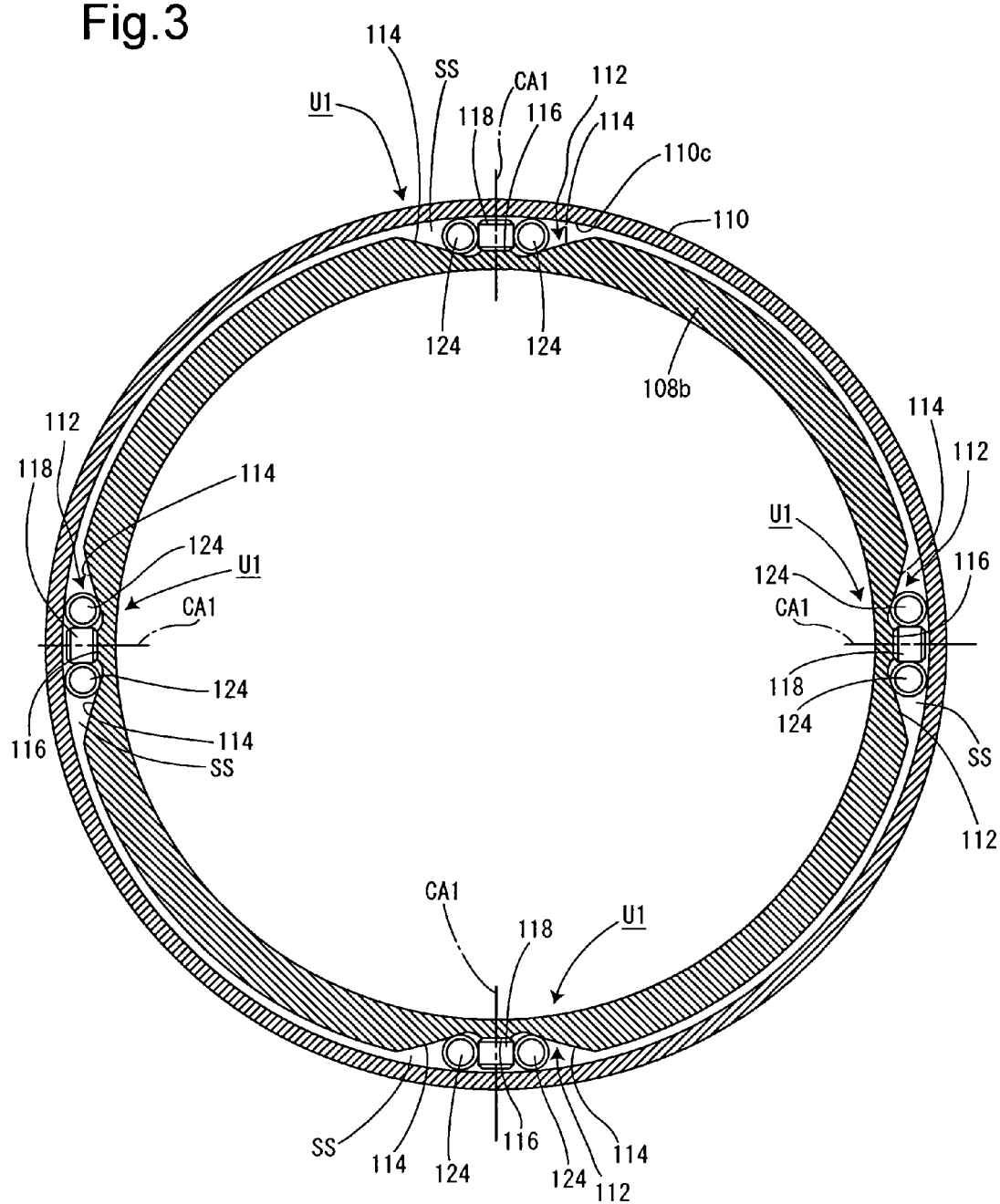
FIG. 3 is a cross sectional view taken along the II-II line in FIG. 2, in which a lens holder ring, a movable ring and a focusing lens group are not shown.

As shown in FIG. 3, the annular projection 108b of the manual focus ring 108 is provided on an outer peripheral surface thereof at equi-angular intervals in a circumferential direction with a set of four accommodation recesses 112 which are recessed radially inwards. Each accommodation recess 112 is formed by a pair of circumferentially-uneven-depth grooves 114, each of which has different radial depths at different circumferential positions, and a flat portion 116 formed between each pair of circumferentially-uneven-depth grooves 114.

Figure 4:
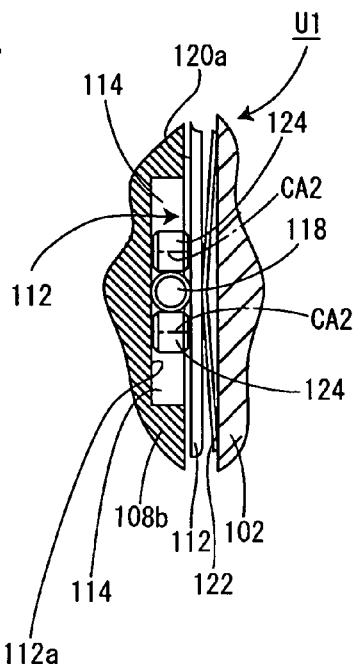
FIG. 4 is a sectional view of a portion of a first one-way rotational transfer mechanism incorporated in the photographic lens shown in FIG. 2, viewed from the outside of an annular projecting portion of a manual focus ring.
Figure 5:
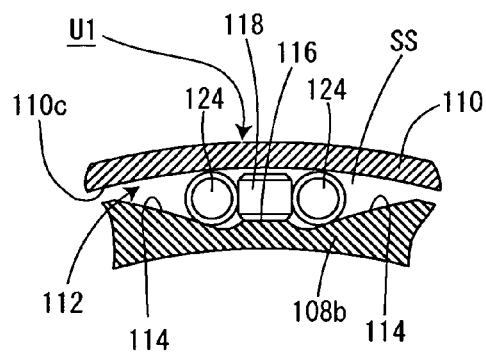
FIG. 5 is a cross sectional view of a portion of the first one-way rotational transfer mechanism in a neutral state thereof.

As shown in FIG. 4, an inner front surface in each accommodation recess 112 is formed as an axially-orthogonal surface 112a which lies in a plane orthogonal to the optical axis O. An accommodation space (circumferentially-uneven-width space) SS having different shapes at different circumferential positions is formed between the inner peripheral surface 110c of the distance adjustment ring 110 and each accommodation recess 112, which is formed by one pair of circumferentially-uneven-depth grooves 114 and the associated flat portion 116. Circumferentially opposite end portions of each accommodation space SS are formed as two wedge-shaped (radially-narrowed) circumferentially opposite end portions the radial depths of which decrease in circumferentially opposite directions away from the center of the accommodation space SS (i.e., away from the associated flat portion 116).

As shown in FIGS. 3 through 6, a differential roller (differential rotating member) 118 is installed between each flat portion 116 and the inner peripheral surface 110c of the distance adjustment ring 110 so that an axis (axis of rotation) CA1 of the differential roller 118 extends in a radial direction of the manual focus ring 108. As shown in FIGS. 2 and 4, an annular flat member 120, which is seen as a ring shape as viewed from the front thereof, is fitted on a rear portion of the lens holder ring 104 and positioned in an annular space between a front end surface of the second stationary ring 102 and a rear end of the annular projection 108b. An annular leaf spring 122 which has a ring shape as viewed from the front thereof is fitted on the rear portion of the lens holder ring 104 and positioned in the annular space between the annular flat member 120 and the front end surface of the second stationary ring 102. The annular leaf spring 122 continuously biases the annular flat member 120 forward so that a pressing surface 120a on the front of the annular flat member 120 remains in pressing contact with a rear surface of each differential roller 118 to bias each differential roller 118 forward, thus causing a front surface of each differential roller 118 to be continuously pressed against the axially-orthogonal surface 112a of the associated accommodation recess 112.

Additionally, a pair of engageable rollers 124 are installed in each accommodation recess 112 (each accommodation space SS) on opposite sides of the associated differential roller 118 in a manner so as to hold the differential roller 118 between the pair of engageable rollers 124 and so that an axis CA2 of each engageable roller 124 extends in a direction parallel to the optical axis O. The peripheral surface of each engageable roller 124 is freely rotatable while being in contact with the associated circumferentially-uneven-depth groove 114 and the inner peripheral surface 110c of the distance adjustment ring 110.

As shown in FIG. 2, the photographic lens 100 is provided, in an annular space (which has a ring shape as viewed from the front of the photographic lens 100) formed between the lens holder ring 104 and the annular wall 108a of the manual focus ring 108, with a ball retaining ring 126 so that the ball retaining ring 126 is freely rotatable about the optical axis O. The ball retaining ring 126 is provided at equi-angular intervals in a circumferential direction with a plurality of insertion holes 126a (only one of them is shown in FIG. 2). A ball 128 (like that of a ball bearing) is installed in each insertion hole 126a to be freely rotatable therein while remaining in contact with a front surface of the annular wall 108a and the lens holder ring 104.

The annular projection 108b of the manual focus ring 108, the inner peripheral surface 110c of the distance adjustment ring 110, the four accommodation recesses 112 (the axially-orthogonal surface 112a, the four pairs of circumferentially-uneven-depth grooves 114 and the four flat portions 116), the differential rollers 118, the annular flat member 120, the annular leaf spring 122 and the four pairs of engageable rollers 124 are elements which constitute a first one-way rotational transfer mechanism U1.

The photographic lens 100 is provided in the installation space S with a second one-way rotational transfer mechanism U2 for connecting and disconnecting the distance adjustment ring 110 to and from the lens joint 245, the rotary shaft 246 and the pinion P.

Namely, when the lens joint 245 rotates, this rotation of the lens joint 245 is transferred to the distance adjustment ring 110 via the second one-way rotational transfer mechanism U2. If the distance adjustment ring 110 rotates in forward and reverse directions, the focusing lens group L2 (the movable ring 111) moves forward and rearward along the set of three linear guide slots 102a of the second stationary ring 102, respectively.

Figure 7:
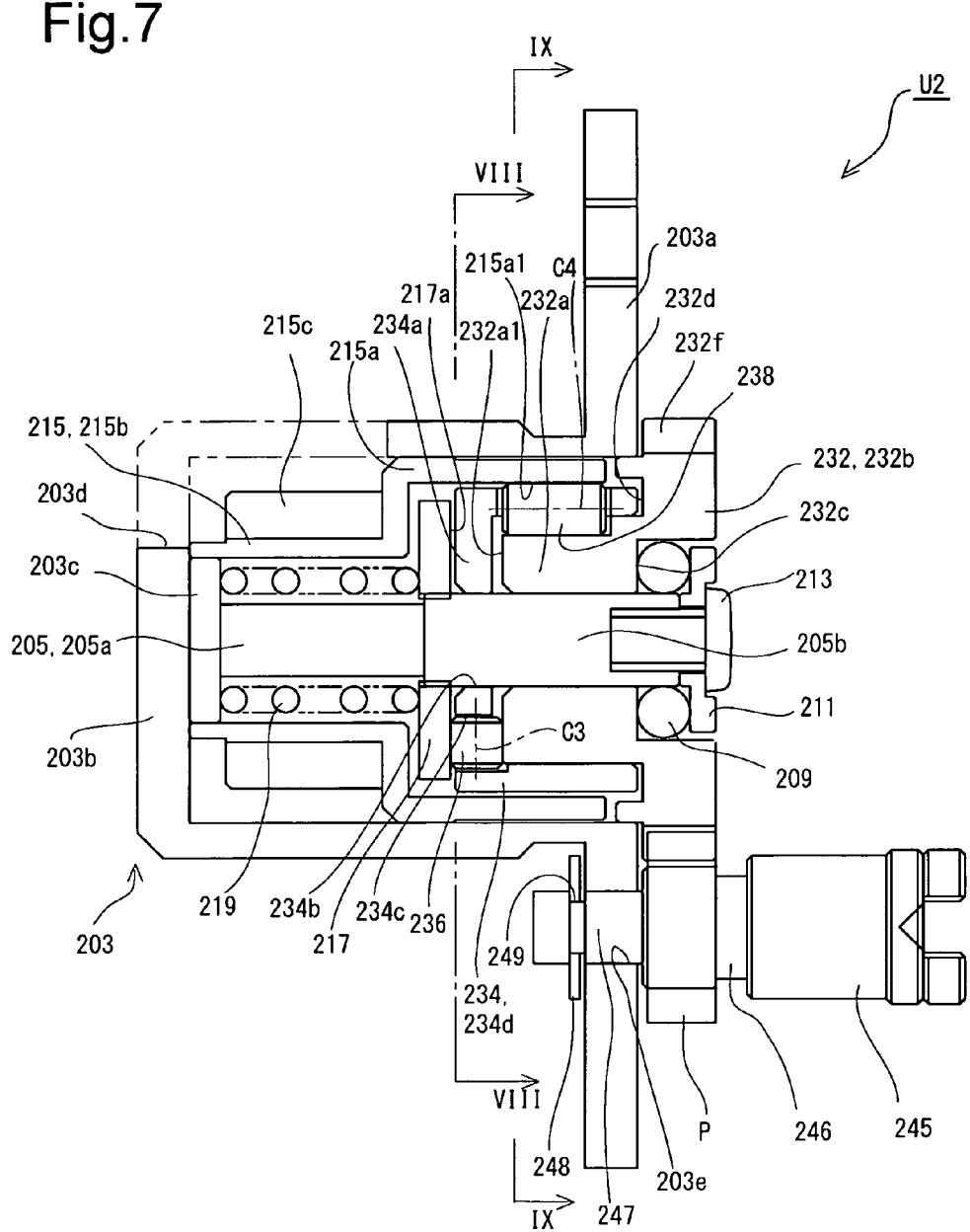
FIG. 7 is a longitudinal cross sectional view of an upper half of an embodiment of a second one-way rotational transfer mechanism.

As shown in FIG. 7, the second one-way rotational transfer mechanism U2 is provided with a cylindrical housing 203 which has a substantially closed end at the front thereof and an open end at the rear thereof. The cylindrical housing 203 is provided at a rear end thereof with an annular flange 203a which is fixed to the first stationary ring 101 by set screws (not shown). The cylindrical housing 203 is provided at a front end thereof with a front wall 203b, and a disc plate 203c is fixed to a rear surface of the front wall 203b at the center thereof so as to project rearward from the front wall 203b. The second one-way rotational transfer mechanism U2 is provided radially inside the housing 203 with a rotational shaft (stationary shaft) 205 which is positioned coaxially with the axis of the housing 203. A front surface of the rotational shaft 205 is fixed to a rear surface of the disc plate 203c. The rotational shaft 205 has a front small-diameter portion 205a and a rear large-diameter portion 205b. The axial direction of the rotational shaft 205 is parallel to the optical axis O.

The second one-way rotational transfer mechanism U2 is provided inside the housing 203 with a hollow-cylindrical rotary output shaft 215. The rotary output shaft 215 is rotatable about the rotational shaft 205. The rotary output shaft 215 is provided with a large-diameter portion 215a and a small-diameter portion 215b, in that order from the rear end to the front end of the rotary output shaft 215. A front end portion of the small-diameter portion 215b is fitted on an outer peripheral surface of the disc plate 203c to be supported thereby so that the small-diameter portion 215b is rotatable on the disc plate 203c, while the large-diameter portion 215a is slidably fitted in an inner peripheral surface of the housing 203 to be supported thereby to be rotatable about the rotational shaft 205. A compression coil spring 219 is installed in an annular space between the small-diameter portion 215b of the rotary output shaft 215 and the front small-diameter portion 205a of the rotational shaft 205 in a compressed state, and an annular member 217, a cylindrical retainer 234 and a hollow-cylindrical rotary input shaft 232 are installed in that order in an annular space between the large-diameter portion 215a of the rotary output shaft 215 and the rear large-diameter portion 205b of the rotational shaft 205 to be freely rotatable on the rear large-diameter portion 205b.

The second one-way rotational transfer mechanism U2 is provided on the large-diameter portion 205b of the rotational shaft 205 with the hollow-cylindrical rotary input shaft 232 having a small-diameter portion 232a at the front and a large-diameter portion 232b at the rear. The rotary input shaft 232 is provided on a rear surface of the large-diameter portion 232b with an annular recess 232c, and is further provided on an annular front surface of the large-diameter portion 232b with an annular engaging recess 232d (seen as an annular recess as viewed from the front of the rotary input shaft 232). A plurality of steel balls 209 are circumferentially positioned in the annular recess 232c to surround the rear large-diameter portion 205b. A stop ring 211 having a diameter substantially the same as the diameter of the annular recess 232c is fixed to the rear end surface of the rear large-diameter portion 205b by a set screw 213 to prevent the rotary input shaft 232 from coming off the rear large-diameter portion 205b.

Figure 9:
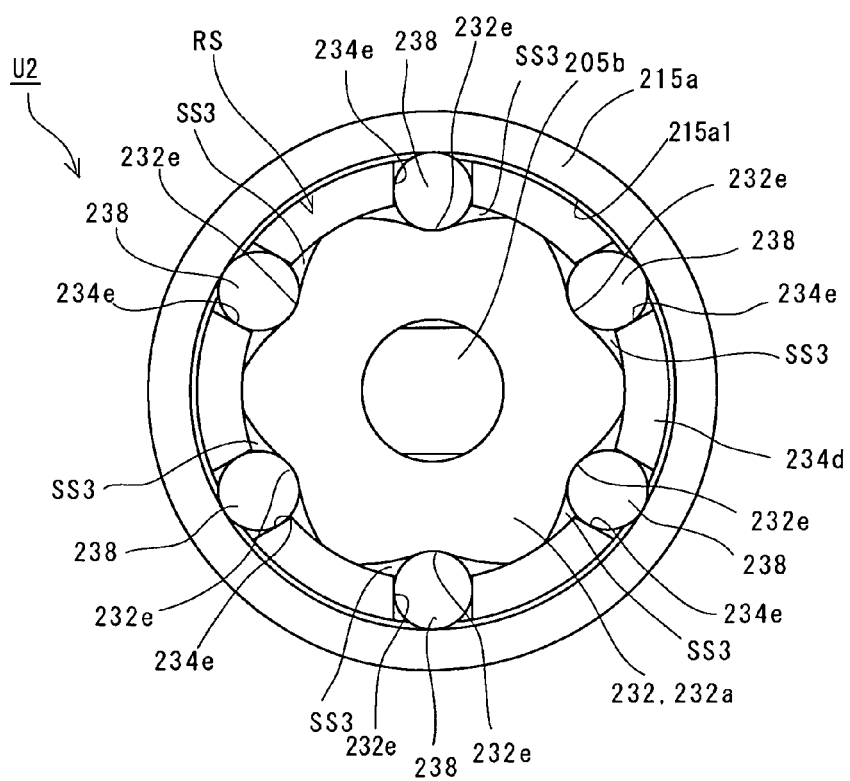
FIG. 9 is a cross sectional view taken along IX-IX line shown in FIG. 7.

The large-diameter portion 232b of the rotary input shaft 232 is circular in cross section, while the small-diameter portion 232a of the rotary input shaft 232 is provided, on an outer peripheral surface thereof at equi-angular intervals in a circumferential direction of the rotary input shaft 232, with six circumferentially-uneven-depth grooves 232e which have different radial depths at different circumferential positions (see FIG. 9). The second one-way rotational transfer mechanism U2 is provided between each circumferentially-uneven-depth groove 232e and an inner peripheral surface (cylindrical surface) 215a1 of the large-diameter portion 215a of the rotary output shaft 215 with an accommodation space SS3 having different radial widths at different circumferential positions. In other words, an annular space RS which is formed between the large-diameter portion 215a of the rotary output shaft 215 and the small-diameter portion 232a of the rotary input shaft 232 is divided into six to form the six accommodation spaces SS3. The rotary input shaft 232 is provided on an outer peripheral surface of the large-diameter portion 232b with an input gear 232f which is in mesh with the pinion P.

The lens joint 245 is provided at the end of the rotary shaft 246 with a small-diameter shaft portion 247 which projects from the pinion P to pass through a bearing hole 203e bored in the annular flange 203a of the cylindrical housing 203. The small-diameter shaft portion 247 is provided, on a portion thereof which is positioned outside of the bearing hole 203e, with a circumferential groove 249 in which a snap ring 248 having the shape of a substantially letter E is engaged in the circumferential groove 249 to prevent the small-diameter shaft portion 247 from coming out of the bearing hole 203e.

Figure 8:
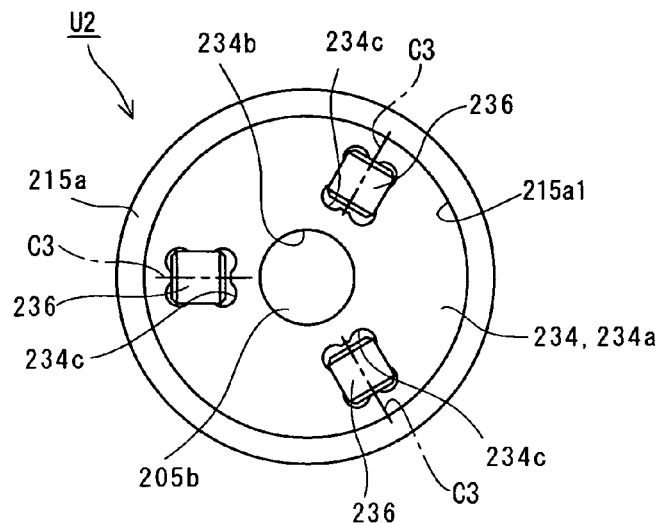
FIG. 8 is a cross sectional view taken along VIII-VIII line shown in FIG. 7.

As mentioned above, the second one-way rotational transfer mechanism U2 is provided in the large-diameter portion 215a of the rotary output shaft 215 with the cylindrical retainer 234. The rear end of the cylindrical retainer 234 is formed as an open end. The cylindrical retainer 234 is provided at a center of a front wall 234a of the cylindrical retainer 234 with an insertion hole 234b in which the rotational shaft 205 is inserted. As shown in FIG. 8, the cylindrical retainer 234 is provided, on the front wall 234a thereof at equi-angular intervals in a circumferential direction, with three fitting holes 234c. A differential roller (differential rotating member) 236 having a substantially columnar shape is installed in each of the three fitting holes 234c so that the differential roller 236 is rotatable about an axis C3 thereof which extends in a radial direction of the rotary output shaft 215. The periphery of each differential roller 236 partly projects forward from a front surface of the front wall 234a of the cylindrical retainer 234, and partly projects rearward from a rear surface of the front wall 234a of the cylindrical retainer 234.

As shown in FIG. 7, each differential roller 236 is continuously held between the pressing surface 217a of the annular member 217 and an axially-orthogonal surface 232a1, which is formed on a front surface of the rotary input shaft 232 so as to lie on a plane orthogonal to the optical axis O, since a front portion and a rear portion of the peripheral surface of each differential roller 236 are in contact with the pressing surface 217a of the annular member 217 and the annular surface 232a1 of the rotary input shaft 232, respectively, while each differential roller 236 is biased rearward by the compression coil spring 219.

As shown in FIG. 9, a cylindrical portion 234d of the cylindrical retainer 234 is positioned in the annular space RS that is formed between the large-diameter portion 215a of the rotary output shaft 215 and the small-diameter portion 232a of the rotary input shaft 232. The cylindrical portion 234d is provided at equi-angular intervals in a circumferential direction with six insertion holes 234e. An engageable roller 238 is installed in each insertion hole 234e so that an axis (axis of rotation) C4 of the engageable roller 238 extends parallel to the axis of the rotational shaft 205, and each engageable roller 238 is freely rotatable on the axis C4 thereof and freely movable linearly along the axis C4 thereof.

An output gear 215c is formed (or firmly fitted) on an outer peripheral surface of the small-diameter portion 215b of the rotary output shaft 215, and is exposed to the outside of the housing 203 via an opening 203d formed on a front portion of the housing 203. The input gear 110a of the distance adjustment ring 110 is engaged with the output gear 215c through the opening 203d of the housing 203.

The photographing lens 100 is provided with an AF switch SWAF (not shown) which is manually operated for selectively enabling and disabling an autofocusing operation. Upon the AF switch SWAF being switched ON, the lens CPU 150 communicates with the body CPU 35 to instruct the body CPU 35 that the photographic lens 100 can perform an auto-focusing operation in AF mode.

Operations of the photographic lens 100 when a focusing operation is performed in AF mode will be discussed hereinafter. The AF switch SWAF is in a switched-ON state so that the photographic lens 100 can perform an auto-focusing operation.

Upon the photometering SWS being switched ON in a state the focusing switch SWF of the camera body 11 is ON, an auto-focusing operation is started by the body CPU 35. Upon the commencement of the auto-focusing operation, the AF motor 39 is rotated, so that this rotation of the AF motor 39 is transferred to the lens joint 245 of the second one-way rotational transfer mechanism U2 of the photographic lens 100 via the body joint 45 of the camera body 11.

At this time, if the rotation direction of the AF motor 39 is such that an object at a close distance is brought into focus, the lens joint 245 rotates clockwise as viewed from the front thereof, and this rotation is transferred to the rotary input shaft 232 via the pinion P and the input gear 232f so that the rotary input shaft 232 rotates counterclockwise as viewed in FIG. 9. Thereupon, each differential roller 236 that is held between the pressing surface 217a of the annular member 217 and the axially-orthogonal surface 232a1 of the rotary input shaft 232 revolves around the axis of the rotary input shaft 232 in the same direction (counterclockwise direction) as the rotational direction of the rotary input shaft 232 at a speed half of the rotational speed of the rotary input shaft 232 while rotating on the axis C3 of the differential roller 236. Accordingly, the cylindrical retainer 234 and each engageable roller 238 which rotate around the rotational shaft 205 together with each differential roller 236 rotate relative to the rotary input shaft 232 clockwise, i.e., in a direction in which the radial width of the associated accommodation space SS3 gradually reduces.

A further clockwise rotation of the cylindrical retainer 234 and each engageable roller 238 relative to the rotary input shaft 232 causes each differential roller 238 to firmly wedge into that wedge-shape (radially-narrowed) circumferentially opposite end portions of the associated accommodation space SS3 which is positioned on the clockwise side in the accommodation space SS3 between one of the opposite end portions of the associated circumferentially-uneven-depth groove 232e, which is positioned on the clockwise side and the inner peripheral surface 215a1 of the large-diameter portion 215a, in a manner so that the differential roller 238 does not slip on either the associated circumferentially-uneven-depth groove 232e or the inner peripheral surface 215a1. This causes the small-diameter portion 232a (the rotary input shaft 232) and the rotary output shaft 215 to become integral with each other circumferentially via the six engageable rollers 238, the cylindrical retainer 234 and the three differential rollers 236, so that the rotation of the small-diameter portion 232a is transferred to the rotary output shaft 215 to rotate the rotary output shaft 215 counterclockwise. Thereupon, this rotation of the rotary output shaft 215 is transferred to the input gear 110a via the output gear 215c, so that the distance adjustment ring 110 rotates counterclockwise to move the focusing lens group L2 forward along the optical axis O. The six engageable rollers 238, the six circumferentially-uneven-depth grooves 232e, the small-diameter portion 232a of the rotary input shaft 232, the rotary output shaft 215, the cylindrical retainer 234 and the three differential rollers 236 constitute a transfer-switching clutch device.

On the other hand, in the case where the AF motor 39 rotates in the reverse direction (in a direction to bring an object at an infinite distance into focus), this reverse rotation of the AF motor 39 is transferred to the rotary input shaft 232 via the engagement of the pinion P with the input gear 232f, so that the rotary input shaft 232 rotates clockwise as viewed in FIG. 9. Thereupon, each differential roller 236 revolves around the axis of the rotary input shaft 232 in the same direction (clockwise direction) as the rotational direction of the rotary input shaft 232 at a speed half of the rotational speed of the rotary input shaft 232, while each engageable roller 238 and the cylindrical retainer 234 rotate counterclockwise relative to the rotary input shaft 232. As a result, each engageable roller 238 rotates counterclockwise in the associated accommodation space SS3 to wedge into the other of the wedge-shape (radially-narrowed) circumferentially opposite end portions of the associated accommodation space SS3, which is positioned on the counterclockwise side in the accommodation space SS3 between the other of the opposite end portions of the associated circumferentially-uneven-depth groove 232e, which is positioned on the counterclockwise side and the inner peripheral surface 215a1 of the large-diameter portion 215a, in a manner so that the differential roller 238 does not slip on either the associated circumferentially-uneven-depth groove 232e or the inner peripheral surface 215a1. This causes the small-diameter portion 232a (the rotary input shaft 232) and the rotary output shaft 215 to become circumferentially integral with each other via the six engageable rollers 238, the cylindrical retainer 234 and the three differential rollers 236. Thereafter, the rotational force of the small-diameter portion 232a is transferred to the rotary output shaft 215 to rotate the rotary output shaft 215 clockwise to thereby move the focusing lens group L2 rearward along the optical axis O.

Additionally, in the present embodiment of the camera system, immediately after the AF motor 39 is stopped after being driven, the AF motor 39 is subsequently driven to rotate in the direction opposite to the rotation direction thereof, immediately before an in-focus state is obtained, by an amount of rotation which is greater than a backlash amount which occurs in a rotation transfer system (AF drive system) including the AF motor 39, the gear unit 43, the body joint 45, the lens joint 245, the pinion P, and the input gear 232f, by an angle of rotation which disengages each engageable roller 238 from one of the wedge-shape circumferentially opposite end portions of the associated accommodation space SS3 to rest at a neutral position therein. Thereupon, the rotary input shaft 232 rotates in the direction opposite to the rotation direction thereof immediately before an in-focus state is obtained without rotating the rotary output shaft 215, so that each engageable roller 238 is disengaged from one of the wedge-shape circumferentially opposite end portions of the associated accommodation space SS3 so that the rotary output shaft 215 and the rotary input shaft 232 are released (disengaged) from each other, and accordingly, the manual focus ring 108 can be rotated smoothly thereafter.

In the state shown in FIG. 9, rotating the manual focus ring 108 of the photographing lens 100 causes the rotary output shaft 215 to rotate clockwise or counterclockwise, however, this rotational force of the rotary output shaft 215 is not transferred to each engageable roller 238, thus not causing the rotary input shaft 232 to rotate because the inner peripheral surface 215a1 of the large-diameter portion 215a of the rotary output shaft 215 is circular as viewed from the front thereof. Accordingly, the AF drive system from the pinion P to the AF motor 39 does not rotate.

Moreover, in the present embodiment of the camera system, the adoption of the cylindrical retainer 234 makes it possible to utilize the annular space RS, that is formed between the large-diameter portion 215a of the rotary output shaft 215 and the small-diameter portion 232a of the rotary input shaft 232, in an effective manner. As a result, the number of the engageable rollers 238 can be increased, and an increase in the number of the engageable rollers 238 makes it possible to improve the torque transmission efficiency from the rotary input shaft 232 to the rotary output shaft 215.

Operations of the photographic lens 100 when a focusing operation is performed in MF mode will be discussed hereinafter. In the case where a focusing operation is performed in MF mode, the AF switch SWAF is switched OFF beforehand so that the AF motor 39 is not rotated by control of the body CPU 35.

Figure 6:
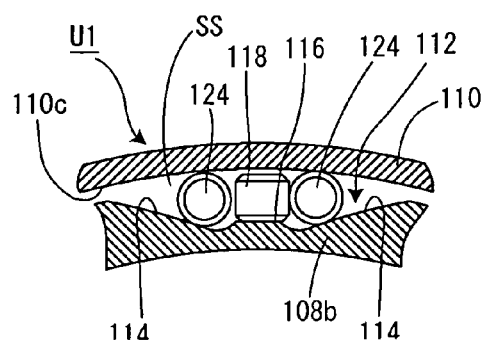
FIG. 6 is a view similar to that of FIG. 5, showing the same portion of the first one-way rotational transfer mechanism when the manual focus ring is rotated.

In this state, wherein the AF switch SWAF is switched OFF, if the manual focus ring 108 is manually rotated by the user counterclockwise as viewed from the front of the photographic lens 100, each differential roller 118, which is held between the pressing surface 120a of the annular flat member 120 and the axially-orthogonal surface 112a of the manual focus ring 108, revolves around the optical axis O in the same direction (counterclockwise direction) as the rotation direction of the manual focus ring 108 while rotating on the axis CA1 of the differential roller 118 in the associated accommodation recess 112. During this movement of each differential roller 118, provided that no slip occurs either between each differential roller 118 and the pressing surface 120a or between each differential roller 118 and the axially-orthogonal surface 112a, the revolving speed of each differential roller 118 around the optical axis O is half of the rotational speed of the manual focus ring 108. As a result, each differential roller 118 revolves clockwise as viewed from the front thereof relative to the manual focus ring 108 as shown in FIG. 6. Therefore, each differential roller 118 comes in contact with one of the associated pair of engageable rollers 124 which is positioned on the clockwise side as viewed from the front thereof, and subsequently biases this engageable roller 124 so that it rotates clockwise about the optical axis O. This engageable roller 124 rotates clockwise in the associated accommodation space SS to firmly wedge into that one of the wedge-shape (radially-narrowed) circumferentially opposite ends of the associated accommodation space SS which is positioned on the clockwise side in the accommodation space SS between the associated circumferentially-uneven-depth groove 114 and the inner peripheral surface 110c of the distance adjustment ring 110. This causes the manual focus ring 108 and the distance adjustment ring 110 to become integral with each other circumferentially via the wedged engageable rollers 124 so that the rotation of the manual focus ring 108 is transferred to the distance adjustment ring 110 to rotate the distance adjustment ring 110 counterclockwise together with the manual focus ring 108.

This counterclockwise rotation of the distance adjustment ring 110 causes the focusing lens group L2 to move forward along the optical axis O. The rotational force of the distance adjustment ring 110 is transferred from the input gear 110a to the output gear 215c of the output rotary shaft 215. Thereupon, the output rotary shaft 215 rotates counterclockwise about the rotational shaft 205. However, when the rotary input shaft 232 is at rest in a neutral state as shown in FIG. 9, no rotational force of the rotary output shaft 215 is transferred to either each engageable roller 238 or each differential roller 236 because the inner peripheral surface 215a1 of the large-diameter portion 215a of the rotary output shaft 215 is circular as viewed from the front thereof. Accordingly, the rotary input shaft 232 does not rotate even if the rotary output shaft 215 rotates, and accordingly, no rotational force is transferred from the rotary output shaft 215 to the pinion P, the rotary shaft 246 or the lens joint 245. Therefore, the AF motor 39 does not apply any load to the rotation of the manual focus ring 108 when the manual focus ring 108 is manually rotated in the MF mode, so that a manual focusing operation is carried out smoothly.

On the other hand, if the manual focus ring 108 is manually rotated by the user clockwise as viewed from the front of the photographic lens 100, each differential roller 118, which is held between the pressing surface 120a of the annular flat member 120 and the axially-orthogonal surface 112a of the manual focus ring 108, revolves around the optical axis O in the same direction (clockwise direction) as the rotation direction of the manual focus ring 108 while rotating about the axis CA1 of the differential roller 118 in the associated accommodation recess 112. During this movement of each differential roller 118, provided that no slip occurs either between each differential roller 118 and the pressing surface 120a or between each differential roller 118 and the axially-orthogonal surface 112a, the revolving speed of each differential roller 118 around the optical axis O is half of the rotational speed of the manual focus ring 108. As a result, each differential roller 118 revolves counterclockwise as viewed from the front thereof relative to the manual focus ring 108. Therefore, each differential roller 118 comes in contact with one of the associated pair of engageable rollers 124 which is positioned on the counterclockwise side as viewed from the front thereof, and subsequently biases this engageable roller 124 so that it rotates counterclockwise about the optical axis O. This engageable roller 124 rotates counterclockwise in the associated accommodation space SS to firmly wedge into the other of the wedge-shape (radially-narrowed) circumferentially opposite ends of the associated accommodation space SS, which is positioned on the counterclockwise side in the accommodation space SS between the associated circumferentially-uneven-depth groove 114 and the inner peripheral surface 110c of the distance adjustment ring 110. This causes the manual focus ring 108 and the distance adjustment ring 110 to become integral with each other circumferentially via the wedged engageable rollers 124 so that the rotation of the manual focus ring 108 is transferred to the distance adjustment ring 110 to rotate the distance adjustment ring 110 clockwise together with the manual focus ring 108.

This clockwise rotation of the distance adjustment ring 110 causes the focusing lens group L2 to move rearward along the optical axis O. In addition, the rotational force of the distance adjustment ring 110 is transferred from the input gear 110a to the output gear 215c of the output rotary shaft 215. Thereupon, the output rotary shaft 215 rotates clockwise about the rotational shaft 205. However, when the rotary input shaft 232 is at rest in a neutral state as shown in FIG. 9, no rotational force of the rotary output shaft 215 is transferred to either each engageable roller 238 or each differential roller 236 because the inner peripheral surface 215a1 of the large-diameter portion 215a of the rotary output shaft 215 is circular as viewed from the front thereof. Accordingly, the rotary input shaft 232 does not rotate even if the rotary output shaft 215 rotates, so that neither the lens joint 245 nor the AF motor 39 is rotated by rotation of the rotary input shaft 232. Therefore, the AF drive system from the rotary input shaft 232 to the AF motor 39 does not apply any load to the rotation of the manual focus ring 108 when the manual focus ring 108 is manually rotated in the MF mode, so that a manual focusing operation is carried out smoothly.

As can be understood from the above description, in the present embodiment of the photographic lens 100, even if the manual focus ring 108 is rotated, this rotational force of the manual focus ring 108 is not transferred to the AF motor 39. Therefore, a photographing operation in the MF mode, in which an object is brought into focus manually by operating the manual focus ring 108, can be performed smoothly with the AF switch SWAF remaining ON, i.e., without the need for the AF switch SWAF to be switched OFF even when the AF switch SWAF is ON.

In addition, the second one-way rotational transfer mechanism U2 is constructed so that a torque of the rotary input shaft 232 can be securely transmitted to the rotary output shaft 215 because each differential ball 236 is made to revolve around the rotary input shaft 232 in the same direction as the rotation direction of the rotary input shaft 232 while trailing behind the rotation of the rotary input shaft 232, and because each engageable roller 238 is subsequently made to wedge firmly between the rotary input shaft 232 and the rotary output shaft 215 to serve as a torque transfer member. Consequently, an autofocusing operation can be performed reliably. Moreover, since each engageable roller 238, which serves as a torque transfer member, is formed in a cylindrical column shape having the axis C4 that extends parallel to the axis of the rotational shaft 205, each engageable roller 238 is in contact with each of the rotary input shaft 232 and the rotary output shaft 215 on a contact area greater than that in the case where the torque transfer member is spherical in shape. Therefore, the efficiency of transferring torque from the rotary input shaft 232 to the rotary output shaft 215 in the second one-way rotational transfer mechanism U2 is higher than that in the case where each torque transfer member is spherical in shape.

The number of the differential rollers 236 or the engageable rollers 238 that are accommodated in each accommodation space SS3 can be changed by changing a cross sectional shape of the small-diameter portion 232a to a regular polygonal shape other than a square shape such as a regular triangular shape or a regular pentagonal shape, or by forming the small-diameter portion 232a to have a non-circular cross section so as to include at least one circumferentially-uneven-width-space forming portion (portion having a non-circular cross section) for forming at least one accommodation space (accommodation space SS3 having different radial widths at different circumferential positions) between the inner peripheral surface (cylindrical surface) 215a1 of the rotary output shaft 215 and the small-diameter portion 232a. With this change in the number of the differential rollers 236 or the engageable rollers 238, the efficiency of transferring torque from the rotary input shaft 232 to the rotary output shaft 215 can be adjusted.

In the photographic lens 100, under operating conditions in the AF mode, each engageable roller 238 firmly wedges into either one of the wedge-shape circumferentially opposite end portions of the associated accommodation space SS3 when the AF motor 39 stops rotating upon an in-focus state being obtained, upon the photometering switch SWS being turned OFF or upon some moving part such as a portion of the focusing lens group L2 reaching the infinite distance focus position (one mechanical travel limit) or the shortest distance focus position (the other mechanical travel limit). Accordingly, in the present embodiment of the camera system, the AF motor 39 is rotated in the reverse direction by a small predetermined amount of reverse movement which is not sufficient to move the focusing lens group L2 but is sufficient to disengage each wedged engageable roller 124 from one of the wedge-shape circumferentially opposite end portions of the associated accommodation space SS3, so that each wedged (locked) engageable roller 124 is released to rest at a neutral position thereof.

An AF process which is performed by the body CPU 35 of the camera body 11 will be hereinafter discussed with reference to the flow charts shown in FIGS. 10 through 13. This AF process is completed when in a neutral state wherein each wedged engageable roller 124 is released to rest at a neutral position thereof by a rotation of the AF motor 39 in a determined rotation direction thereof when the AF motor 39 is stopped after being driven.

Figure 10:
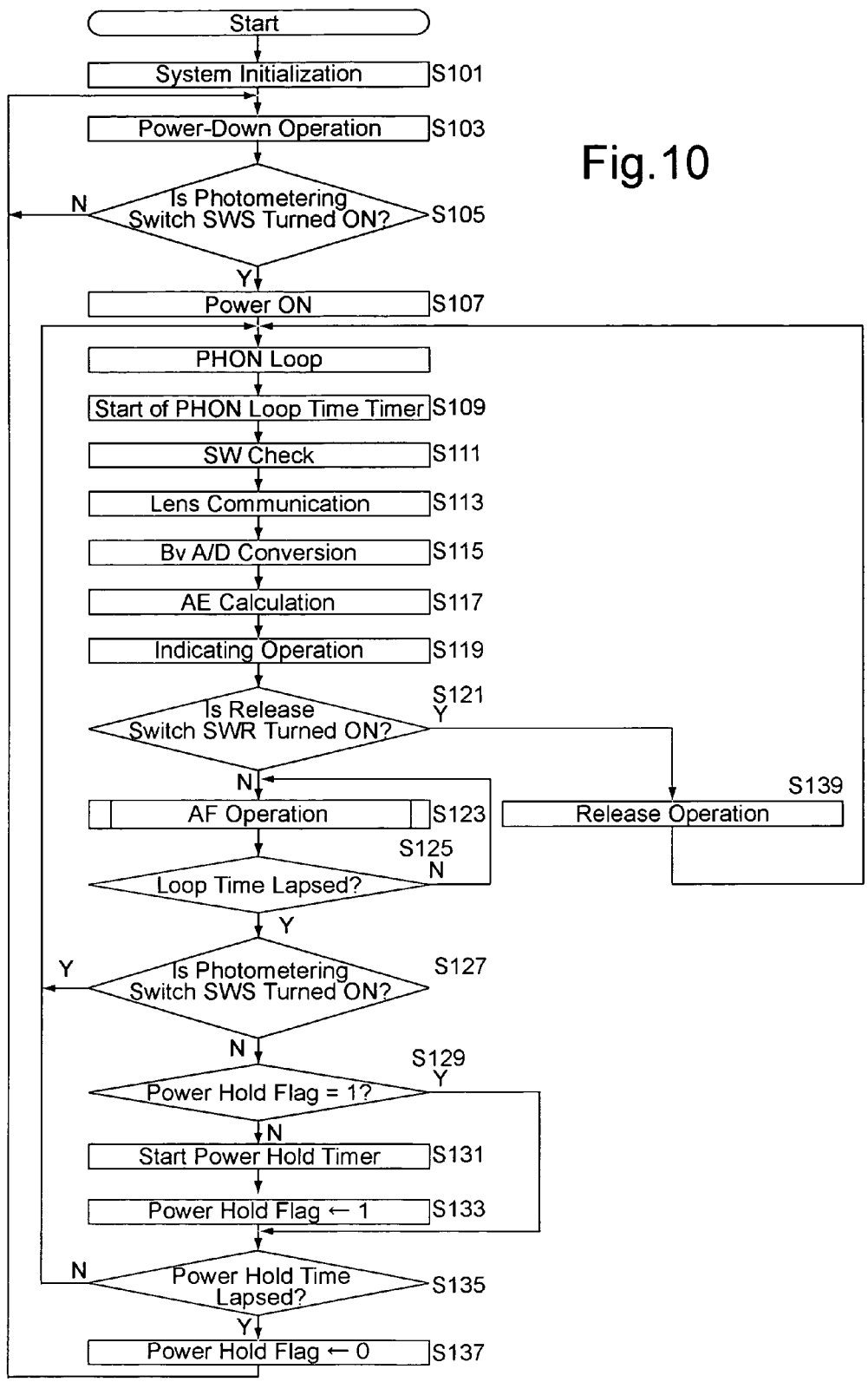
FIG. 10 is a flow chart showing an embodiment of a main process performed in the camera system shown in FIG. 1.

When a battery (not shown) is loaded in the camera body 11 and the main switch SWM is turned ON, control enters a main routine shown in FIG. 10. Firstly, the body CPU 31 performs the initialization of the system which generally controls the overall operation of the camera system at step S101. This system initialization includes a startup of the body CPU 31, reading of microprograms from the ROM 35a, and initialization of the cache, the input/output port and the flags, etc. Thereafter, operations from steps S103 through S139 are carried out while a predetermined voltage is supplied from the battery.

Firstly, a power-down operation is performed to stop the power supply to all components other than the body CPU 31 (step S103). Thereafter, whether or not the photometering switch SWS is ON is checked (step S105). If the photometering switch SWS is not ON (step S105, N), control returns to step S103, at which the power-down operation is carried out, so that the power-down state is maintained. If it is determined at step S105 that the photometering switch SWS is ON (step S105, Y), the power supply is turned ON (step S107), and control enters a PHON loop process which starts at step S109. The power-on operation (step S107) is carried out to supply the battery power to not only the body CPU 31 but also all the remaining components. As a result photographing mode is indicated on, for example, the display device 49.

[PHON Loop]

In the PHON loop process, a PHON loop time timer is started (step S109). The PHON loop time corresponds to an interval at which AF operations are mainly carried out repeatedly. Thereafter, a switch checking operation in which the state of each switch is input (step S111) and a lens communication is carried out to obtain lens data from the photographic lens 100 (step S113). In the present embodiment of the camera system, data on the amount of backlash and the amount of travel limit backlash, which are stored in the lens memory 153, is input in addition to basic lens data such as data on focal length and data on minimum/maximum f-number of the photographing lens 100. The aforementioned amount of backlash generally corresponds to data on the amount of rotation of the lens joint 245 which is necessary for disengaging each engageable roller 238 from one of the wedge-shape circumferentially opposite end portions of the associated accommodation space SS3 to bring the engageable roller 238 back to a neutral state thereof, in the case where the focusing lens group L2 is stopped at a position between the opposite mechanical travel limits thereof, and the aforementioned amount of travel limit backlash corresponds to data on the amount of rotation of the lens joint 245 which is necessary for disengaging each engageable roller 238 from one of the wedge-shape circumferentially opposite end portions of the associated accommodation space SS3 to bring the engageable roller 238 back to a neutral state thereof, in the case where the AF motor 39 is stopped after the focusing lens group L2 abuts against either of the opposite mechanical travel limits thereof. As a rule, the amount of travel limit backlash is greater than the amount of backlash.

An object brightness signal Bv obtained by the photometering IC 19 is input from the peripheral control circuit 23 and is A/D-converted (step S115), and an AE calculation operation is carried out by an algorithm corresponding to a selected exposure mode (step S117) to determine a shutter speed and an f-number, which are indicated on the display device 49 (step S119).

Thereafter, it is checked whether or not the release switch SWR is ON (step S121). If the release switch SWR is ON (step S121, Y), a release operation is performed (step S139), and control returns to the PHON loop process. If the release switch SWR is not ON (step S121, N), an AF process at step S123 is repeated until the PHON loop time elapses (steps S125, N and S123). After a lapse of the PHON loop time (step S125, Y), it is checked whether or not the photometering switch SWS is ON (step S127). If the photometering switch SWS is ON (step S127, Y), control returns to the first step (step S109) of the PHON loop process.

If the photometering switch SWS is not ON (step S127, N), it is determined whether or not a power hold flag is "1" (step S129). If the power hold flag is not "1", a power hold timer is started (step S131), and the power hold flag is set to "1" (step S133), and control proceeds to step S135. If the power hold flag is "1" (step S129, Y), control skips the operations at steps S131 and S133 to proceed to step S135.

It is checked at step S135 whether or not the power hold time has elapsed. If the power hold time has elapsed (step S135, Y), the power hold flag is set to "0" (step S137), and control returns to step S103. If the power hold time has not elapsed (step S135, N), control simply returns to the first step (step S109) of the PHON loop process. Namely, the operations from steps S109 through S135 are repeated from the time the photometering switch SWS is turned OFF until the power hold time elapses. Upon the expiration of the power hold time after the photometering switch SWS is turned OFF, the power hold flag is set to "0" (step S137). Subsequently, control returns to step S103 to carry out the power-down operation and waits for the photometering switch SWS to be turned ON in the power-down state (step S105).

[AF Process]

Figure 11:
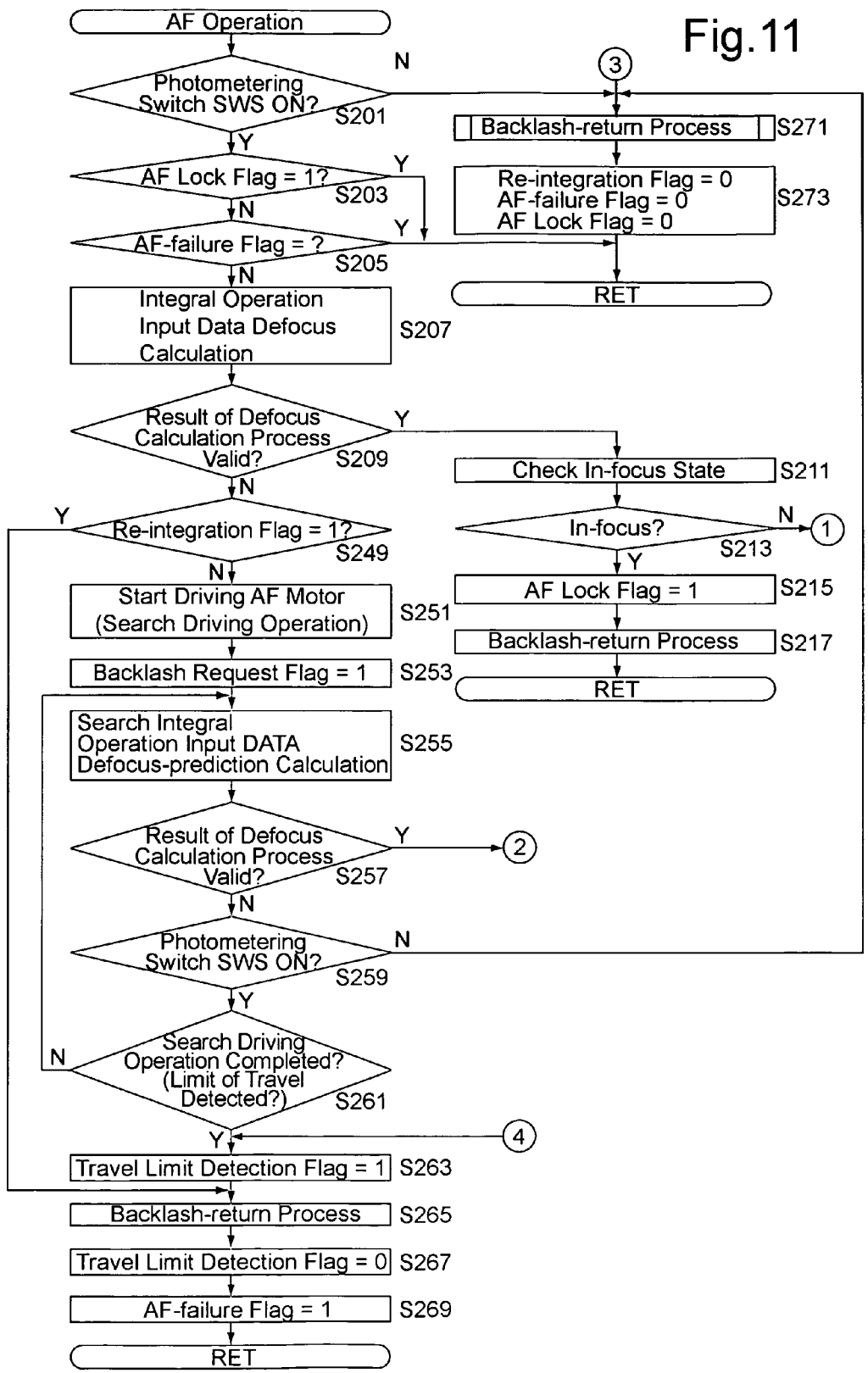
FIG. 11 is a flow chart showing operations of an AF process performed in the main process shown in FIG. 10.

The AF process that is performed at step S123 will be discussed in detail with reference to FIGS. 11 and 12. In the AF process, firstly it is checked whether or not the photometering switch SWS is ON (step S201). If the photometering switch SWS is not ON (step S201, N), a backlash-return process is performed (step S271), and a re-integration flag, an AF-failure flag and an AF lock flag are set to "0" (step S273). Thereafter, control returns. The re-integration flag is for determining whether an integral operation has been carried out at least once before, from when control enters the AF process, and is set to "1" when the integral operation has been performed at least once before in the AF process. The AF-failure flag is set to "1" when an in-focus state is not obtained (step S269). The AF lock flag is set to "1" so that the ON state of the photometering switch SWS is maintained when an in-focus state is obtained (steps S213, Y; and S215).

If the photometering switch SWS is ON (step S201, Y), it is checked whether or not the AF lock flag is "1" (step S203). If the AF lock flag is not "1" (step S203, N), it is checked whether or not the AF-failure flag is "1" (step S205). If either the AF lock flag or the AF-failure flag is set to "1" (step S203, Y; or S203, N and S205, Y), control returns.

If control enters the AF process for the first time, neither of the AF lock flag nor the AF-failure flag is "1" (step S203; N and S205; N), the AF sensor unit 21 is activated to perform an integral operation, integral data is input, and a defocus calculation process is performed (step S207). Thereafter, it is checked whether or not the result of the defocus calculation process is valid (step S209).

[The Case where Defocus Calculation Process is Valid]

If the amount of defocus calculated at step S207 is valid (the result of the defocus calculation process is valid) (step S209, Y), it is checked whether or not the calculated amount of defocus can be regarded as an in-focus state (whether or not an in-focus state has been obtained) (step S211). If the calculated amount of defocus can be regarded as an in-focus state (step S213, Y), the AF lock flag is set to "1" (step S215), the backlash-return process is performed (step S217), and control returns.

Figure 12:
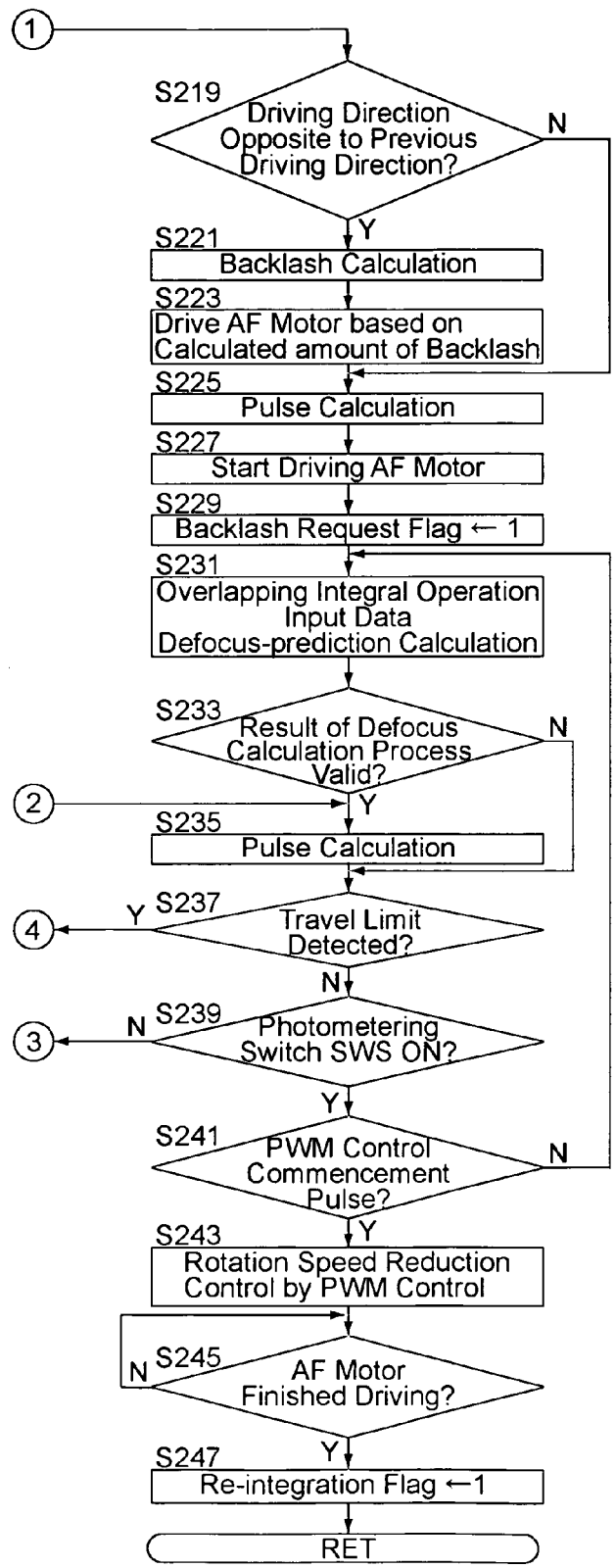
FIG. 12 is a flow chart showing operations of the AF process performed in the main process shown in FIG. 10.

If the calculated amount of defocus cannot be regarded as an in-focus state (step S213, N), it is checked whether or not the driving direction (rotation direction) of the AF motor 39 is opposite to the previous driving direction thereof (step S219) (see FIG. 12). If the driving direction of the AF motor 39 is opposite to the previous driving direction thereof (step S219, Y), a backlash-return calculation is performed based on the data on the amount of backlash input from the photographic lens 100 (step S221); namely, the amount of driving of the AF motor 39 which is necessary for disengaging each engageable roller 238 from one of the wedge-shape circumferentially opposite end portions of the associated accommodation space SS3 to bring the second one-way rotational transfer mechanism U2 to a neutral state thereof is calculated based on the data on the amount of backlash input from the photographic lens 100. Thereafter, based on the amount of backlash thus calculated, the AF motor 39 is driven to bring the second one-way rotational transfer mechanism U2 to a neutral state thereof (step S223). If the driving direction of the AF motor 39 is not opposite to the previous driving direction thereof (step S219, N), control skips the operations at steps S221 and S223. Thereafter, the number of AF pulses corresponding to the amount of driving of the AF motor 39 which is necessary for moving the focusing lens group L2 to an in-focus position is calculated (step S225), and the driving of the AF motor 39 is started (step S227). Subsequently, a backlash request flag is set to "1" (step S229).

Subsequently, an overlapping integral operation in which an integral operation is performed while the AF motor 39 is driven, the integral data is input, and the defocus-prediction calculation is performed, in order to determine a defocus amount (step S231). If the result of the defocus calculation process is valid (step S233, Y), the number of AF pulses necessary for moving the focusing lens group L2 to an in-focus position is calculated (step S225) so as to set the built-in counter 35d at this calculated number of AF pulses (step S235). Subsequently, it is checked whether or not a travel limit has been detected (whether or not the focusing lens group L2 has reached either the infinite distance focus position or the shortest distance focus position of the focusing lens group L2) (step S237). If a travel limit has not yet been detected (step S237, N), it is checked whether or not the photometering switch SWS is ON (step S239). If the photometering switch SWS is ON (step S239, Y), it is checked whether or not the counter value of the built-in counter 35d (the calculated number of AF pulses) corresponds to the aforementioned PWM control commencement pulse (step S241). If the counter value of the built-in counter 35d does not correspond to the PWM control commencement pulse (step S241, N), control returns to S231 to repeat the operations at steps S231 through S241.

Upon the counter value of the built-in counter 35d reaching the value of the PWM control commencement pulse (step S241, Y), the rotation speed of the AF motor 39 is reduced to stop the AF motor 39 by the PWM control (step S243). Subsequently, it is checked whether or not the AF motor 39 has finished driving, i.e., whether or not the counter value of the built-in counter 35d has reached zero so as to stop the AF motor 39 rotating (steps S245, N and S245). If the AF motor 39 has finished driving (step S245, Y), the re-integration flag is set to "1" (step S247), and control returns (RET).

If a travel limit is detected during the loop process from step S233 until S241 (step S237, Y), control proceeds to step S263 to set a travel limit detection flag to "1", the backlash-return process is performed (step S265), the travel limit detection flag is set to "0" (step S267), the AF-failure flag is set to "1" (step S269), and control returns. If the photometering switch SWS is turned OFF (step S239, N), control proceeds to step S271 to perform the backlash-return process. Subsequently, the re-integration flag, the AF-failure flag and the AF lock flag are all set to "0" (step S273), and control returns (RET).

[The Case where Defocus Calculation Process is Invalid]

If the amount of defocus calculated at step S207 is invalid (step S209, N), it is checked whether or not the re-integration flag is "1" (step S249). If the re-integration flag is not "1" (step S249, N), an AF motor driving operation (lens driving operation) is performed for in order to start a search driving operation (step S251). In the search driving operation, the AF motor 39 is driven firstly in the direction toward the infinite object distance (or the direction toward the shortest object distance) and subsequently in the opposite direction upon the focusing lens group L2 abutting against either of the opposite mechanical travel limits thereof to drive the focusing lens group L2 over the range of movement thereof while both the integral data inputting operation, in which integral data is input from the AF sensor unit 21, and the defocus-prediction calculation are being performed.

Subsequently, the backlash request flag is set to "1" (step S253) and a search integral operation, the integral data inputting operation and the predictor calculation are performed to calculate a defocus amount (step S255). Subsequently, it is checked whether or not the result of the defocus calculation process is valid (step S257). The operations at steps S255 and S257 are repeated until the photometering switch SWS is turned ON (step S259, Y) and the search driving operation is completed (whether or not a travel limit has been detected) (steps S261, N and S255).

If the result of the defocus calculation process is valid (step S257, Y), control proceeds to step S235. If the photometering switch SWS is turned OFF (step S259, N), control proceeds to step S271. If a travel limit has been detected (i.e., the search driving operation is completed) (step S261, Y), the travel limit detection flag is set to "1" (step S263), the backlash-return process is performed (step S265), the travel limit detection flag is set to "0" (step S267), the AF-failure flag is set to "1" (step S269), and control returns.

If the re-integration flag is "1" (step S249, Y), control skips the operations at steps S251 through S263 to proceed to the backlash-return process at step S265.

[Backlash-Return Process]

Figure 13:
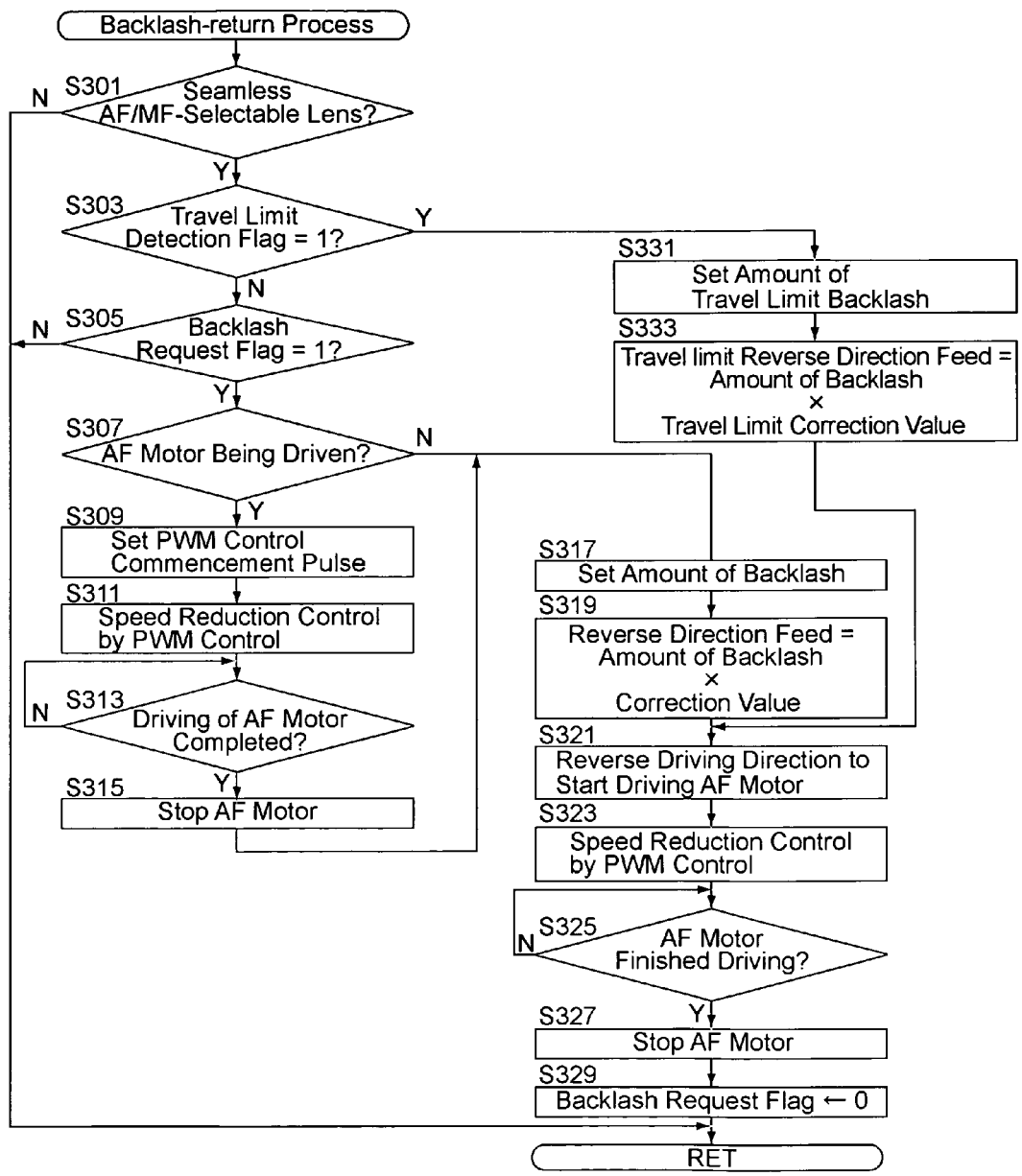
FIG. 13 is a flow chart showing a backlash-return process performed in the AF process shown in FIGS. 11 and 12.

The backlash-return process that is performed at steps S217, S265 and S271 will be hereinafter discussed in detail with reference to the flow chart shown in FIG. 13. The backlash-return process is performed to return each wedged engageable roller 238 back to a neutral state to thereby release the interconnection between the distance adjustment ring 110, the output rotary shaft 215 and the rotary input shaft 232, from a state where the small-diameter portion 232*a* (the rotary input shaft 232) and the rotary output shaft 215 integrally rotate while rotation is transferred to the input gear 110*a* of the distance adjustment ring 110 to move the focusing lens group L2 along the optical axis O wherein each differential roller 238 firmly wedges into one of the wedge-shape circumferentially opposite end portions of the associated accommodation space SS3 by a rotation of the rotary input shaft 232, rotated by the AF motor 39, in a direction toward either the infinite object distance or the shortest object distance. In other words, the backlash-return process is performed to bring the second one-way rotational transfer mechanism U2 back to a disengaged state (neutral state) thereof from an engaged state thereof.

In the backlash-return process, firstly it is checked whether or not the photographing lens 100 attached to the camera body 11 is a seamless AF/MF-selectable photographing lens that incorporates the aforementioned seamless AF/MF switching mechanism (step S301). If the photographing lens 100 is not a seamless AF/MF-selectable photographing lens (step S301, N), control returns (RET). If the photographing lens 100 is a seamless AF/MF-selectable photographing lens (step S301, Y), control proceeds to step S303 to perform operations from step S303 onward in the backlash-return process.

[The Case where Focusing Lens Group is Stopped at a Position Between Opposite Mechanical Travel Limits Thereof]

It is checked whether or not the travel limit detection flag is "1" (step S303). If the travel limit detection flag is not "1" (step S303, N), i.e., if the AF motor 39 is stopped to stop the focusing lens group L2 at a position between the opposite mechanical travel limits thereof, it is checked whether the backlash request flag is "1" (step S305). If the backlash request flag is not "1" (step S305; N), control returns (RET).

If the backlash request flag is "1" (step S305, Y), it is checked whether or not the AF motor 39 is current being driven (step S307). The AF motor 39 is not at rest if the photometering switch SWS is turned OFF before the completion of the AF process, and is at rest if the AF process is completed.

If the AF motor 39 is current being driven (step S307, Y), the built-in counter 35*d* is set to the PWM control commencement pulse (step S309), the aforementioned speed reduction control by PWM control is started (step S311), and control waits for the speed reduction control by PWM control to stop driving the AF motor 39 (step S313, N and S313). If the speed reduction control by PWM control stops driving the AF motor 39 (if the counter value of the built-in counter 35*d* becomes zero) (step S313, Y), the AF motor 39 is stopped (step S315), and control proceeds to step S317. If the AF motor 39 is not current being driven (step S307, N), control skips the operations at steps S309 through S315 to proceed to step S317.

At step S317, the amount of backlash is set based on the data on the amount of backlash of the photographic lens 100 received therefrom via lens communication. Thereafter, the reverse direction feed for rotating the AF motor 39 in the reverse direction is calculated based on the amount of backlash and a correction value to set the built-in counter 35*d* to this calculated reverse direction feed (step S319). This correction value is pre-stored in memory such as the EEPROM 47 in consideration of the case where the data on the amount of backlash, that the photographing lens 100 has stored as lens data, is not always an appropriate amount in the present embodiment to bring the second one-way rotational transfer mechanism U2 back to a neutral state thereof, even though this lens data corresponds to the amount of backlash which occurs when the driving direction of the AF motor 39 is reversed. Namely, the correction value serves as a value with which the amount of backlash capable of releasing each wedged engageable roller 238 back to a neutral position thereof can be obtained.

At step S321, the driving direction of the AF motor 39 is set to the reverse driving direction thereof, i.e., the driving direction opposite to the driving direction immediately before the AF motor 39 stops (i.e., the driving direction opposite to the driving direction at steps S227 and S251) and the AF motor 39 is actuated so as to rotate (step S321). Subsequently, the aforementioned speed reduction control by PWM control is started (step S323), and control waits for the speed reduction control by PWM control to stop driving the AF motor 39 (waits for the counter value of the built-in counter 35*d* to become zero (steps S325, N, and S325). If the speed reduction control by PWM control stops driving the AF motor 39 (step S325, Y), the AF motor 39 is stopped (step S327), the backlash request flag is set to "0" (step S329), and control returns (RET).

[The Case where Focusing Lens Group is Stopped at One of the Opposite Mechanical Travel Limits Thereof]

If the travel limit detection flag is "1" (if control enters the backlash-return process via the operation at step S263) (step S303, Y), i.e., if the focusing lens group L2 stops by abutting against either of the opposite mechanical travel limits thereof, the amount of travel limit backlash that is input from the photographic lens 100 as lens data thereof is set (step S331), a travel limit reverse direction feed is determined as the number of AF pulses by multiplying the amount of backlash by a travel limit correction value and the built-in counter 35d is set to this number of AF pulses (step S333). Thereafter, an AF-motor reverse drive process consisting of the operations at steps S321 through S329 is performed, and control returns (RET).

Each of the data on the amount of backlash and the data on the amount of travel limit backlash, which are stored in advance as lens data of the photographing lens 100, concern the amount of reverse rotation of the lens joint 24 which is necessary for releasing each wedged engageable roller 238 of the second one-way rotational transfer mechanism U2 to bring the second one-way rotational transfer mechanism U2 to a disconnected state. However, backlash exists on the camera body 11 side between the AF motor 39 and the body joint 45 (and the backlash between the body joint 45 and the lens joint 245), and accordingly, backlash on the camera body 11 side and the number of AF pulses which occurs in the rotation transfer system that extends from the AF motor 39 up to the body joint 45 to rotate the body joint 45 in units of rotations may vary between models of camera bodies. Such variations are determined as the correction value and the travel limit correction value which are pre-stored in the EEPROM 47 in the present embodiment of the camera system. As a rule, the correction value is smaller than the travel limit correction value because the amount of backlash is smaller than the amount of travel limit backlash. The correction value and the travel limit correction value are values which are set in accordance with backlash occurring mainly in the mechanisms provided in the camera body 11.

Hence, an accurate backlash amount of the drive mechanisms can be calculated with consideration of not only the amount of backlash which occurs within the photographic lens 100, but also with consideration of the amount of backlash which occurs within the camera body 11 (which changes depending an the type of AF motor and drive mechanism employed).

In the illustrated embodiment, the correction value and the backlash correction value have been indicated as coefficients for simplicity of calculation. However, depending on the camera to which the present invention is applied, the number of AF pulses can correspond to the actual measured amount of backlash, and the correction calculation can include the total number of the AF pulses.

Although the above described embodiment is an embodiment of an SLR camera system using silver-salt film, the present invention can also be applied to an SLR digital camera system. Moreover, the present invention can also be applied to a camera system including a camera body and a photographic lens which are formed integral with each other even though the above illustrated embodiment of the camera system is a type of camera system including a camera body and a photographic lens detachably attached to the camera body.

The structures of the first and second one-way rotational transfer mechanisms U1 and U2 are not limited solely to the particular structures described above; each of the first and second one-way rotational transfer mechanisms U1 and U2 can be a one-way rotational transfer mechanism or a clutch device by which a rotation of the lens drive ring is not transferred to either the manual operation ring or the electric motor when the lens drive ring is rotated even though a rotation of each of the manual operation ring and the electric motor is transferred to the lens drive ring.

Figure 14:
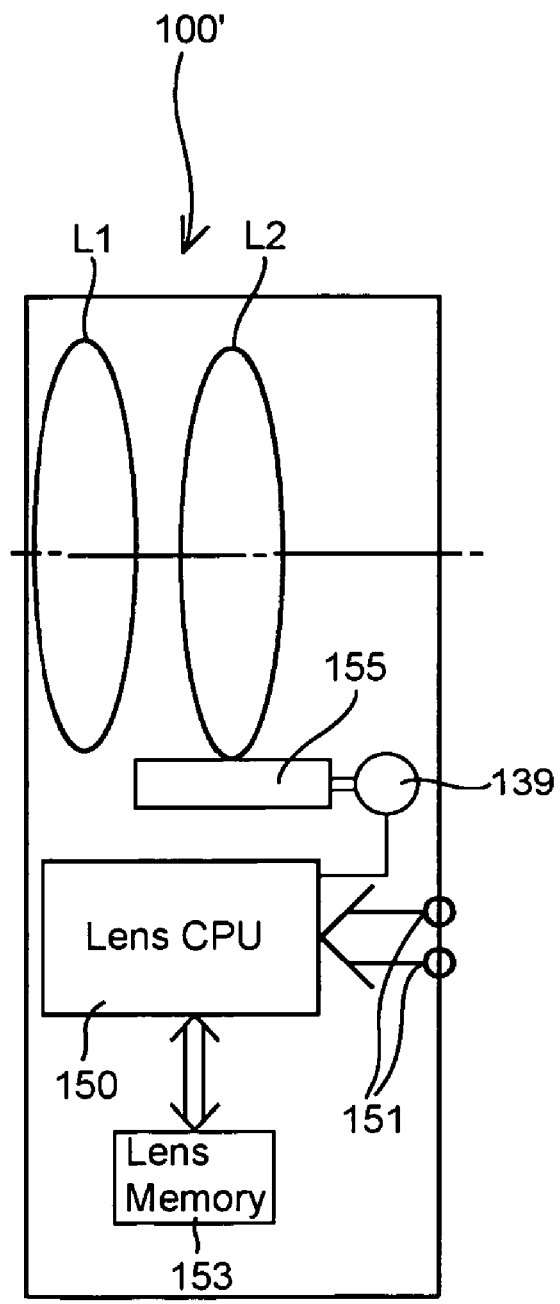
FIG. 14 is a schematic block diagram of elements of an alternative embodiment of a photographic lens mounted to the camera body.

Although in the illustrated embodiment the AF motor 39 is provided in the camera body 11, an AF motor 139 can be alternatively provided within a photographic lens 100', as shown in FIG. 14. In this case, the driving of the AF motor 139 is controlled by the lens CPU 155, and the backlash-return process is controlled by the lens CPU 155.

Although the present invention is applied to a lens drive mechanism for focus adjustment in the above described embodiment, the present invention can also be applied to a lens drive mechanism for focal length adjustment in a power zoom lens (motor-driven zoom lens). In this case, the manual operation ring and the AF motor are replaced by a hand-operated zoom ring and a power zoom motor, respectively, so that a zoom lens drive ring is driven by a rotation of the hand-operated zoom ring via the first one-way rotational transfer mechanisms or a rotation of the power zoom motor via the second one-way rotational transfer mechanism.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera system incorporating a seamless lens-drive switching mechanism, comprising:
   a lens drive ring which moves a movable lens group forward and rearward in an optical axis direction by rotating about an axis of said lens drive ring;
   a manual operation ring which is manually rotated to rotate said lens drive ring;
   an electric motor for rotating said lens drive ring;
   a first one-way rotational transfer mechanism which prevents said manual operation ring and said lens drive ring from being connected with each other in a first neutral state in an electric rotation operation, which connects said manual operation ring with said lens drive ring so that a rotation of said manual operation ring is transferred to said lens drive ring when said manual operation ring rotates in either direction from said first neutral state in a manual rotation operation, and which maintains said first neutral state even when said lens drive ring is rotated by said electric motor in said first neutral state in the electric rotation operation;
   a second one-way rotational transfer mechanism which prevents said electric motor and said lens drive ring from being connected with each other in a second neutral state in the manual rotation operation, which connects said electric motor with said lens drive ring so that a rotation of said electric motor is transferred to said lens drive ring when said electric motor rotates in either direction from said second neutral state in the electric rotation operation, which is brought into the second neutral state after said electric motor is reversely rotated by a predetermined amount after rotation of said electric motor is stopped in the electric rotation operation, and which maintains said second neutral state even when said lens drive ring is rotated by said manual operation ring in said second neutral state in the manual rotation operation; and
   a controller which makes said electric motor stop rotating and subsequently makes said electric motor rotate in a reverse direction by a predetermined amount of rotation to bring said second one-way rotational transfer mechanism into said second neutral state after said electric motor rotates so as to rotate said lens drive ring, and which controls said lens drive ring to transfer rotation of said manual operation ring in the manual rotation operation and which controls said lens drive ring to transfer rotation of said electric motor in the electric rotation operation;

wherein upon said manual operation ring being manually rotated, said lens drive ring is rotated via said first one-way rotational transfer mechanism.

2. A camera system incorporating a seamless lens-drive switching mechanism, comprising:

a lens drive ring which moves a movable lens group forward and rearward in an optical axis direction by rotating about an axis of said lens drive ring;

a manual operation ring which is manually rotated to rotate said lens drive ring;

an electric motor for rotating said lens drive ring;

a first one-way rotational transfer mechanism for transferring a rotation of said manual operation ring to said lens drive ring when said manual operation ring is manually rotated in a manual rotation operation, and for preventing a rotation of said lens drive ring from being transferred to said manual operation ring when said lens drive ring is rotated by said electric motor in an electric rotation operation;

a second one-way rotational transfer mechanism for transferring a rotation of said electric motor to said lens drive ring when said electric motor rotates in the electric rotation operation, for being brought into the second neutral state after rotation of said electric motor is reversely rotated by a predetermined amount after said electric motor is stopped in the electric rotation operation, and for preventing a rotation of said lens drive ring from being transferred to said electric motor when said lens drive ring rotates in the manual rotation operation;

a clutch device, incorporated in said second one-way rotational transfer mechanism, for transferring said rotation of said electric motor to said lens drive ring when said electric motor rotates in one of forward and reverse directions, and to bring said clutch device into a neutral state when said electric motor subsequently rotates in the other of said forward and reverse directions by a predetermined amount of rotation; and a controller which makes said electric motor stop rotating and subsequently makes said electric motor rotate in a reverse direction by a predetermined amount of rotation to thereby disengage said electric motor and said second one-way rotational transfer mechanism from each other after said electric motor is rotated so as to rotate said lens drive ring, and which controls said lens drive ring to transfer rotation of said manual operation ring in the manual rotation operation and which controls said lens drive ring to transfer rotation of said electric motor in the electric rotation operation;

wherein upon said manual operation ring being manually rotated, said lens drive ring is rotated via said first one-way rotational transfer mechanism.

3. The camera system according to claim 2, wherein said lens drive ring, said manual operation ring, said first one-way rotational transfer mechanism and said second one-way rotational transfer mechanism are incorporated in a photographic lens of said camera system, wherein said electric motor and said controller are incorporated in a camera body of said camera system, and wherein said photographic lens and said camera body include a transfer mechanism for transferring said rotation of said electric motor to said clutch device of said second one-way rotational transfer mechanism.

4. The camera system according to claim 3, wherein said photographic lens further comprises a memory in which data on said predetermined amount of rotation is stored, and wherein said controller of said camera body reads out said data on said predetermined amount of rotation from said memory.

5. The camera system according to claim 4, wherein said predetermined amount of rotation comprises a first predetermined amount of rotation and a second predetermined amount of rotation which are different from each other, wherein said first predetermined amount of rotation is used in the case where said movable lens group stops moving upon abutting against a mechanical travel limit thereof while said electric motor is rotating, and wherein said second predetermined amount of rotation is used in the case where said movable lens group is made to stop moving without abutting against said mechanical travel limit.

6. The camera system according to claim 1, wherein said lens drive ring, said manual operation ring, said first one-way rotational transfer mechanism and said second one-way rotational transfer mechanism, said electric motor and said controller are incorporated in a photographic lens of said camera system.

7. The camera system according to claim 1, wherein said lens drive ring comprises a distance adjustment ring provided in a photographic lens of said camera system.

8. The camera system according to claim 1, wherein said movable lens group is one of a plurality of movable lens groups of a photographic lens of said camera system other than a frontmost lens group of said plurality of movable lens groups.

9. The camera system according to claim 1, wherein said movable lens group serves as a focusing lens group, said focusing lens group being moved forward and rearward in said optical axis direction by manually rotating said manual operation ring forward and reverse.

10. The camera system according to claim 3, wherein said first one-way rotational transfer mechanism comprises:

an orthogonal surface formed on said manual operation ring to lie in a plane orthogonal to said optical axis;

an annular overlapping portion formed on said manual operation ring to overlap said lens drive ring in a radial direction of said photographic lens;

a torque transfer cylindrical surface formed on one of an inner peripheral surface and an outer peripheral surface of said lens drive ring to face said annular overlapping portion;

at least one circumferentially-uneven-width-space forming portion formed on said annular overlapping portion to form at least one accommodation space between said annular overlapping portion and said torque transfer cylindrical surface, said accommodation space having different radial widths at different circumferential positions;

a differential rotating member installed in said accommodation space, and pressed against said orthogonal surface by a biasing device, said differential rotating member revolving about an axis of said manual operation ring in a same direction as a rotational direction of said manual operation ring while revolving at a slower speed than a rotation of said manual operation ring in association with said rotation of said manual operation ring; and at least one torque transfer member installed in said accommodation space, said torque transfer member revolving about said axis of said manual operation ring in a same revolving direction as said differential rotating member when pressed by said differential rotating member, wherein said circumferentially-uneven-width-space forming portion is shaped so that said torque transfer member, which revolves in a circumferential direction about said axis of said manual operation ring, wedges between said circumferentially-uneven-width-space forming portion and said torque transfer cylindrical surface to transfer said rotation of said manual operation ring to said lens drive ring when said manual operation ring is manually rotated.

11. The camera system according to claim 3, wherein said second one-way rotational transfer mechanism comprises:

a rotary input shaft having an orthogonal surface lying on a plane orthogonal to an axis of said rotary input shaft;

a hollow-cylindrical rotary output shaft provided around said rotary input shaft to be freely rotatable relative to said rotary input shaft about said axis thereof, said hollow-cylindrical rotary output shaft having a cylindrical inner peripheral surface;

a circumferentially-uneven-width-space forming portion formed on said rotary input shaft to form an annular space including at least one accommodation space between said rotary input shaft and said cylindrical inner peripheral surface, said accommodation space having different radial widths at different circumferential positions;

a differential rotating member pressed against said orthogonal surface by a biasing device, said differential rotating member revolving around said axis of said rotary input shaft in a same direction as a rotational direction of said rotary input shaft while revolving at a slower speed than a rotation of said rotary input shaft in association with said rotation of said rotary input shaft;

a retainer installed in said annular space, and rotating around said axis of said rotary input shaft in a same direction as the revolving direction of said differential rotating member when pressed by said differential rotating member; and at least one torque transfer member supported by said retainer to rotate together with said retainer in said accommodation space, wherein said circumferentially-uneven-width-space forming portion is shaped so that said torque transfer member which rotates in a circumferential direction about said axis of said rotary input shaft wedges between an outer peripheral surface of said rotary input shaft and said cylindrical inner peripheral surface of said hollow-cylindrical rotary output shaft to transfer a torque from said rotary input shaft to said hollow-cylindrical rotary output shaft when said rotary input shaft is rotated.

12. The camera system according to claim 2, wherein said lens drive ring comprises a distance adjustment ring provided in a photographic lens of said camera system.

13. The camera system according to claim 2, wherein said movable lens group is one of a plurality of movable lens groups of a photographic lens of said camera system other than a frontmost lens group of said plurality of movable lens groups.

14. The camera system according to claim 2, wherein said movable lens group serves as a focusing lens group, said focusing lens group being moved forward and rearward in said optical axis direction by manually rotating said manual operation ring forward and reverse.

15. A photographic lens which is detachably attachable to a camera body, said photographic lens having a seamless lens-drive switching mechanism and comprising:

a lens drive ring which moves a movable lens group forward and rearward in an optical axis direction by rotating about an axis of said lens drive ring;

a manual operation ring which is manually rotated to rotate said lens drive ring;

a motor rotation transfer mechanism for rotating said lens drive ring in accordance with a rotational force transferred from said camera body when said photographic lens is detachably attached to said camera body;

a first one-way rotational transfer mechanism which prevents said manual operation ring and said lens drive ring from being connected with each other in a first neutral state, which connects said manual operation ring with said lens drive ring so that a rotation of said manual operation ring is transferred to said lens drive ring when said manual operation ring rotates in either direction from said first neutral state, and which maintains said first neutral state even when said lens drive ring is rotated by said motor rotation transfer mechanism in said first neutral state;

a second one-way rotational transfer mechanism which prevents said motor rotation transfer mechanism and said lens drive ring from being connected with each other in a second neutral state, which connects said motor rotation transfer mechanism with said lens drive ring so that a rotation of said motor rotation transfer mechanism is transferred to said lens drive ring when said motor rotation transfer mechanism rotates in either direction from said second neutral state, and which maintains said second neutral state even when said lens drive ring is rotated by said manual operation ring in said second neutral state;

a memory which stores a value of a predetermined amount of rotation amount necessary for bringing said second one-way rotational transfer mechanism into said second neutral state when said motor rotation transfer mechanism is rotated in an opposite rotational direction upon said rotation of said motor rotation transfer mechanism is stopped after said motor rotation transfer mechanism rotates in one of forward and reverse directions so as to drive said lens drive ring; and a data output device for outputting said predetermined amount of rotation to said camera body.

16. A camera body to which a photographic lens is detachably attachable, said camera body comprising:

a data input device for inputting data from said photographic lens when said photographic lens is detachably attached to said camera body;

an electric motor;

a motor rotation transfer mechanism for transferring rotation of said electric motor to said photographic lens when said photographic lens is detachably attached to said camera body;

a memory which stores data of the amount of backlash of said electric motor and said motor rotation transfer mechanism when a lens rotation transfer mechanism provided in said photographic lens is driven via said electric motor and said motor rotation transfer mechanism; and a controller which inputs lens data via said input device and drives said electric motor in accordance with said lens data;

wherein in the case where said photographic lens, which is detachably attached to said camera body, includes a lens drive ring which moves a movable lens group forward and rearward in an optical axis direction by rotating about an axis of said lens drive ring, a manual operation ring which is manually rotated to rotate said lens drive ring; said lens rotation transfer mechanism for rotating said lens drive ring in accordance with a rotational force transferred from said camera body when said photographic lens is detachably attached to said camera body, a first one-way rotational transfer mechanism which prevents said manual operation ring and said lens drive ring from being connected with each other in a first neutral state, which connects said manual operation ring with said lens drive ring so that a rotation of said manual operation ring is transferred to said lens drive ring when said manual operation ring rotates in either direction from said first neutral state, and which maintains said first neutral state even when said lens drive ring is rotated by said motor rotation transfer mechanism in said first neutral state, a second one-way rotational transfer mechanism which prevents said motor rotation transfer mechanism and said lens drive ring from being connected with each other in a second neutral state, which connects said motor rotation transfer mechanism with said lens drive ring so that a rotation of said motor rotation transfer mechanism is transferred to said lens drive ring when said motor rotation transfer mechanism rotates in either direction from said second neutral state, and which maintains said second neutral state even when said lens drive ring is rotated by said manual operation ring in said second neutral state, a lens memory which stores a value of a predetermined amount of rotation amount necessary for bringing said second one-way rotational transfer mechanism into said second neutral state when said lens rotation transfer mechanism is rotated in an opposite rotational direction upon said rotation of said lens rotation transfer mechanism being stopped after said lens rotation transfer mechanism rotates in one of forward and reverse directions so as to drive said lens drive ring, and a data output device for outputting said predetermined amount of rotation to said camera body, said controller calculates a driving amount of said electric motor necessary for bringing said second one-way rotational transfer mechanism into said second neutral state based on said backlash amount a value of a predetermined rotational amount which is input via said data input device.

17. The camera body according to claim 16, wherein upon said electric motor being driven in one of forward and reverse directions, said controller drives said electric motor in a direction opposite to that of said one of forward and reverse directions by said calculated driving amount.

18. A photographic lens which is detachably attachable to a camera body, said photographic lens having a seamless lens-drive switching mechanism and comprising:

a lens drive ring which moves a movable lens group forward and rearward in an optical axis direction by rotating about an axis of said lens drive ring;

a manual operation ring which is manually rotated to rotate said lens drive ring;

an electric motor for rotating said lens drive ring;

a first one-way rotational transfer mechanism which prevents said manual operation ring and said lens drive ring from being connected with each other in a first neutral state in an electric rotation operation, which connects said manual operation ring with said lens drive ring so that a rotation of said manual operation ring is transferred to said lens drive ring when said manual operation ring rotates in either direction from said first neutral state in a manual rotation operation, and which maintains said first neutral state even when said lens drive ring is rotated by said electric motor in said first neutral state in the electric rotation operation;

a second one-way rotational transfer mechanism which prevents said electric motor and said lens drive ring from being connected with each other in a second neutral state in manual rotation operation, which connects said electric motor with said lens drive ring so that a rotation of said electric motor is transferred to said lens drive ring when said electric motor rotates in either direction from said second neutral state in the electric rotation operation, which is brought into the second neutral state after said electric motor is reversely rotated by a predetermined amount after rotation of said electric motor is stopped in the electric rotation operation, and which maintains said second neutral state even when said lens drive ring is rotated by said manual operation ring in said second neutral state in the manual rotation operation; and a controller which makes said electric motor stop rotating and subsequently makes said electric motor rotate in a reverse direction by a predetermined amount of rotation to bring said second one-way rotational transfer mechanism into said second neutral state after said electric motor rotates so as to rotate said lens drive ring, and which controls said lens drive ring to transfer rotation of said manual operation ring in the manual rotation operation and which controls said lens drive ring to transfer rotation of said electric motor in the electric rotation operation;

wherein upon said manual operation ring being manually rotated, said lens drive ring is rotated via said first one-way rotational transfer mechanism.

19. The camera system according to claim 2, wherein, upon said electric motor being driven in one of forward and reverse directions, said controller drives said electric motor in a direction opposite to that of said one of forward and reverse directions by a calculated driving amount, after which second one-way rotational transfer mechanism is brought into the second neutral state.

* * * * *